United States Patent
DeFelice

(10) Patent No.: US 10,931,702 B2
(45) Date of Patent: Feb. 23, 2021

(54) VULNERABILITY PROFILING BASED ON TIME SERIES ANALYSIS OF DATA STREAMS

(71) Applicant: Jungle Disk, L.L.C., San Antonio, TX (US)

(72) Inventor: Michael DeFelice, San Antonio, TX (US)

(73) Assignee: CyberFortress, Inc., San Antonio, TX (US)

( * ) Notice: Subject to any disclaimer, the term of this patent is extended or adjusted under 35 U.S.C. 154(b) by 346 days.

(21) Appl. No.: 15/961,541

(22) Filed: Apr. 24, 2018

(65) Prior Publication Data

US 2019/0327259 A1    Oct. 24, 2019

(51) Int. Cl.
*H04L 29/06* (2006.01)
*G06N 3/08* (2006.01)

(52) U.S. Cl.
CPC ......... *H04L 63/1433* (2013.01); *G06N 3/084* (2013.01)

(58) Field of Classification Search
CPC . H04L 63/1433; H04L 41/14; H04L 63/1416; H04L 63/1425; G06N 3/084; G06N 21/552; G06F 21/552
See application file for complete search history.

(56) References Cited

U.S. PATENT DOCUMENTS

| | | | | |
|---|---|---|---|---|
| 9,210,185 | B1* | 12/2015 | Pinney Wood | G06F 21/552 |
| 10,375,095 | B1* | 8/2019 | Turcotte | H04L 63/1425 |
| 2012/0232679 | A1 | 9/2012 | Abercrombie et al. | |
| 2012/0317058 | A1* | 12/2012 | Abhulimen | G06N 20/00 706/2 |
| 2013/0347116 | A1 | 12/2013 | Flores et al. | |
| 2017/0140663 | A1* | 5/2017 | Sadeh-Koniecpol | G09B 19/00 |
| 2017/0310690 | A1* | 10/2017 | Mestha | G06F 21/55 |
| 2017/0359366 | A1* | 12/2017 | Bushey | H04L 63/1408 |
| 2018/0139227 | A1* | 5/2018 | Martin | H04L 63/1433 |

OTHER PUBLICATIONS

Massimo Ficco, Security Event Correlation Approach for Cloud Computing , Inderscience Enterprise Ltd (Year: 2011).*

(Continued)

*Primary Examiner* — Shanto Abedin
(74) *Attorney, Agent, or Firm* — Dykema Gossett PLLC

(57) ABSTRACT

Various systems and methods are described for correlating technology choices with the risk of system vulnerabilities. A system captures and quantifies both observations of technology choices as well as the outputs certain outputs of internal choices and processes across a number of different organizations. A Bayesian estimate of vulnerability is imputed from the choices and observed use of vulnerable technology, further segmented by business type, revenue, and size. Differences between the observation of a particular organization and Bayesian expected value are measured and converted to vulnerability score, the vulnerability score embodying a point-in-time and longitudinal measure of organizational performance, including the likelihood of future compromise due to software vulnerabilities. The vulnerability score can then be further used to price risk, for example in a cyber insurance context.

11 Claims, 12 Drawing Sheets

(56) References Cited

OTHER PUBLICATIONS

Heng-Guo Zhang et al, An Online Sequential Learning Nonparametric Value-at-Risk Model for High-Dimensional Time Series, Springer. (Year: 2017).*
Christian Bitter et al, Application of Artificial Neural Network and Related Techniques to Intrusion Detection, IEEE (Year: 2010).*
International Search Report dated Aug. 27, 2019 issued in corresponding PCT Serial No. PCT/US2019/026548.
Written Opinion dated Aug. 27, 2019 issued in corresponding PCT Serial No. PCT/US2019/026548.

* cited by examiner

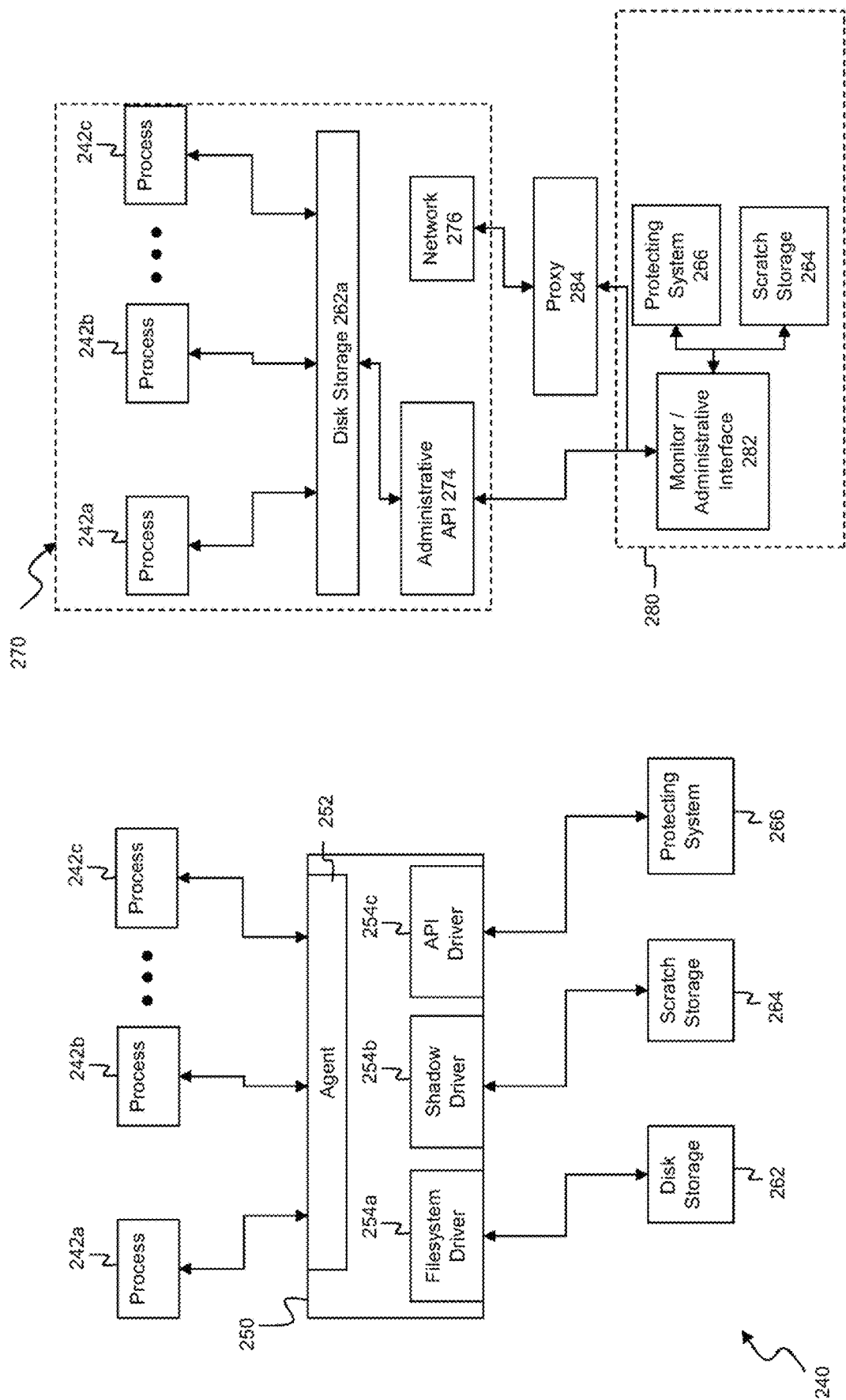

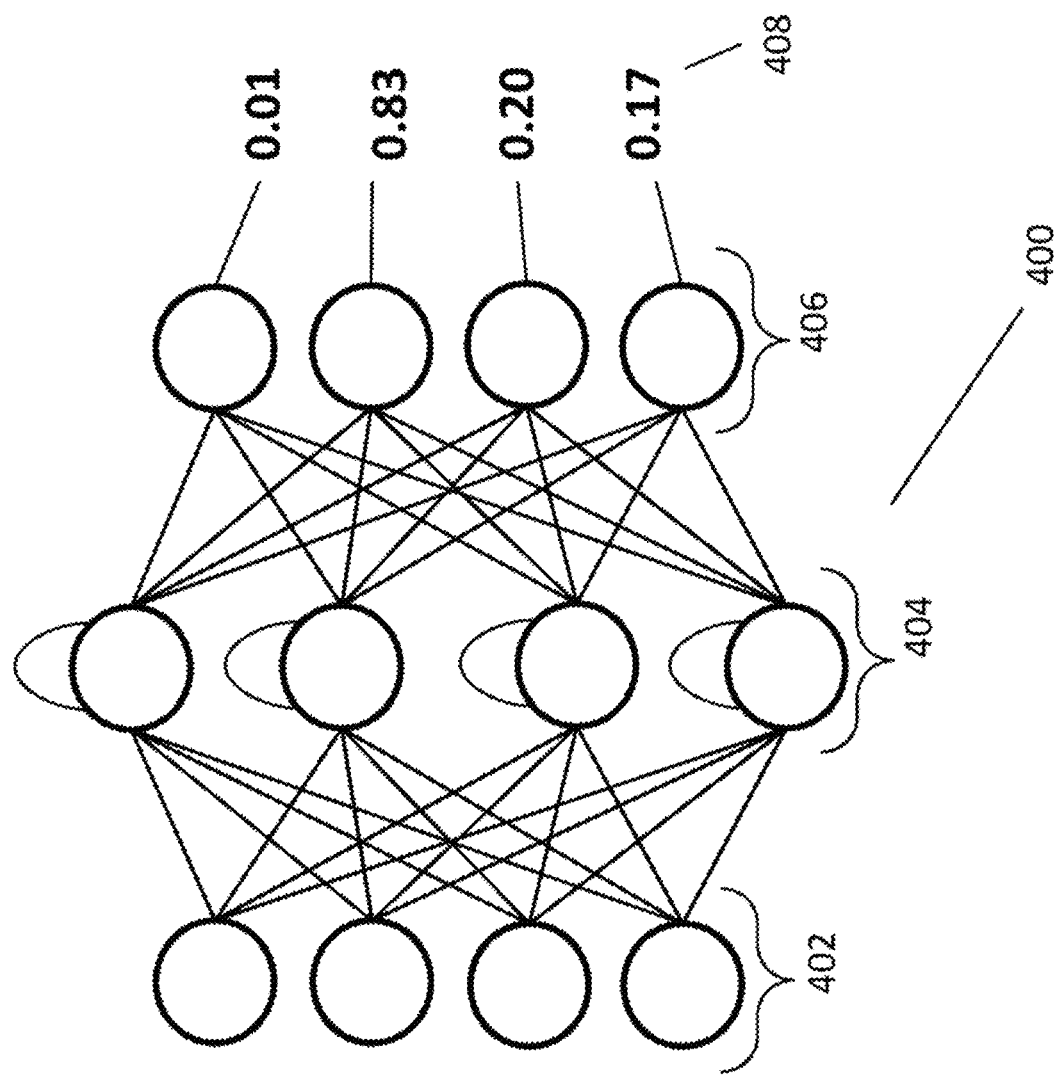

Fig. 5a – Java Vulnerabilities Per Year

Fig. 5b – Python Vulnerabilities Per Year

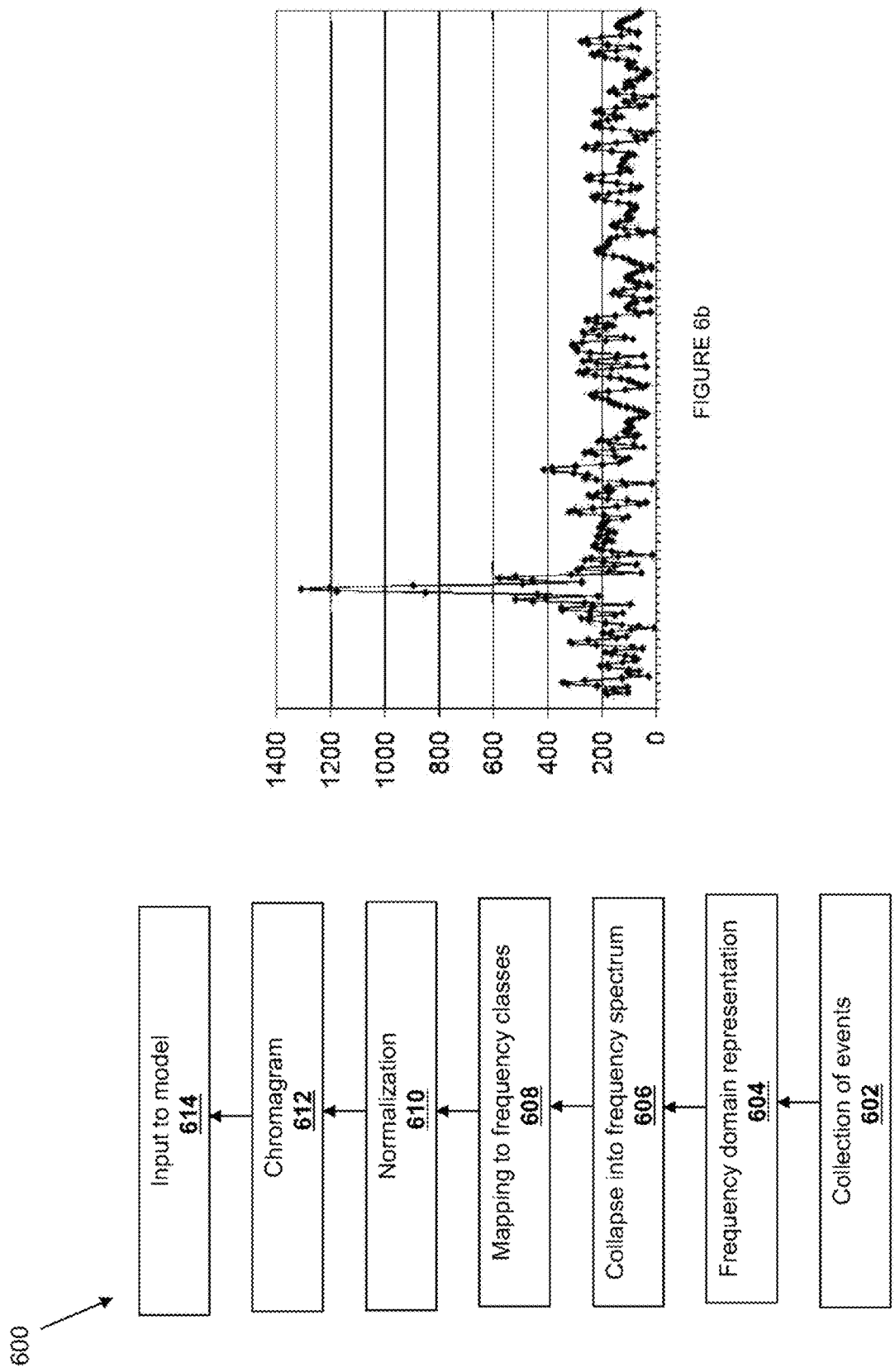

VULNERABILITY PROFILING BASED ON TIME SERIES ANALYSIS OF DATA STREAMS

RELATED APPLICATIONS

This application is related to and incorporates by reference U.S. Ser. No. 15/885,777, titled System for Predicting and Mitigating Organization Disruption Based on File Access Patterns, filed Jan. 31, 2018.

BACKGROUND OF THE INVENTION

Field of the Invention

The present disclosure generally relates to systems for the automated evaluation of the implementation and maintenance of technical systems and the associated implied likelihood of security disruptions or technical errors.

Background

The measurement and quantification of risk is an important process for most types of business activity. Different choices and circumstances are correlated with different amounts of risk. For example, both individuals and businesses have credit scores that attempt to correlate past choices and present circumstances with a future probability of financial default. These credit scores are then used to calculate the cost of insurance, the cost of credit, and the availability of certain types of opportunities.

What makes credit scores possible is the availability of and correlation of financial data. Tracking where money came from and to whom it is due is a core business activity, so good information regarding financial risk has been available for a long time. Dollars earned, dollars spent, and amounts owed, to whom, and on what schedule are clear quantifiable markers that can be analyzed to produce a score that embodies a future-looking determination of the current financial riskiness of a particular person or business.

Evaluating other types of risk can be more difficult. While some correlates of risk are directly measurable, most are not—or at least the number of correlates (and the direction of the correlations) is too complicated for human evaluation. Financial auditing, for example, is one example of the evaluation of internal processes that may lead to financial loss. Risky controls or procedures may be just as highly correlated with financial loss as excessive credit—but business procedures are harder to see, to evaluate, and to manage. It is also harder to quantify certain types of future risk from audit results. There are many other important organizational processes that involve risk, but the best method developed so far for evaluating those unknown or hard-to-quantify risks is the market mechanism—allowing people to place "bets" on whether the current value of a company is too high or too low and act accordingly. The efficient market hypothesis postulates that the average of many people's actions—the market "price"—is a good estimate of the actual value. However, the efficient market hypothesis is both notable for its poor performance as an estimator and the many circumstances under which the hypothesis either doesn't work or isn't applicable. Thus, it is useful to have a better method for identifying and measuring risky behavior at the organizational level, and using that information to predict future outcomes.

The increasing automation of organizational systems presents an opportunity for the capture and measurement of business processes and their correlation with risk. Procedures that would have previously been handled using internal paper forms and social processes, formal or informal, are now increasingly being handled by systems composed of software and hardware. These automated systems are more measurable, both in terms of their constituent parts as well as the performance of the still-human systems that implement, maintain, and improve those systems. While these measurements are not tractable for a human, recent advances in machine learning allow the capture and quantification of certain outputs of internal choices and processes, and can lead to point-in-time and longitudinal measures of organizational performance, including the likelihood of future compromise due to software vulnerabilities.

However, no system, automated or otherwise, exists to evaluate the implied business risk associated with technological behaviors, especially when considered over time. This disclosure presents an advance both in the state of the art related to business processes as well as the systems and methods for evaluating the same.

BRIEF SUMMARY OF THE INVENTION

In various embodiments, a vulnerability measurement system includes a series of probes, each of which returns an observable fact related to an organization's externally-observable systems. The facts returned by each probe are stored in a database organized as a time-ordered series. An estimator, preferably implemented as a neural network model, correlates both the point-in-time observations and the change in observations over time to infer patterns associated with technology implementation choices and non-externally observable maintenance patterns. The implementation choices and inferred maintenance patterns are compared to both known risks and historical peers to create a composite technology risk score, which is a unitless or relative vulnerability measurement identifying comparative risk of organizational disruption due to technology choices and maintenance practices vis-à-vis other comparable organizations.

In one embodiment, the technology risk score is quantified into a dollar amount that is charged as part of an insurance policy or provided as part of a guarantee by a service provider associated with the risk of disruption implied from the observable technology choices and the non-observable inferred maintenance practices.

In one embodiment, the configuration or pricing of a service, guarantee, or insurance policy is differentially modified based upon changes in observed facts related to inferred processes that increase or decrease the chance of organization disruption due to technical vulnerabilities.

In one embodiment, changes in business operations over time are automatically identified based upon observation of system dynamics and protection processes or guarantees are updated according to the model. This specifically includes maintenance patterns, upgrade patterns, and the evolution of technology choices over time for a particular organization.

In various embodiments, the cost of organizational disruptions are also associated with types of technology implementation and maintenance choices, and the use of the vulnerability measurement (and its inferred dollar value) are used to provide actuarial or statistical guidance for insurance underwriting.

BRIEF DESCRIPTION OF THE DRAWINGS

FIG. 2b is an agented system for filesystem metadata collection as used in various embodiments.

FIG. 2c is an agentless system for filesystem metadata collection as used in various embodiments.

FIG. 4a is a neural classification network as used in various embodiments.

FIG. 5a is a graph showing Java vulnerabilities per year.

FIG. 5b is a graph showing Python vulnerabilities per year.

FIG. 6a shows a method of grouping periodic data according to various embodiments.

FIG. 6b is a graph of a periodic trace.

DETAILED DESCRIPTION OF THE INVENTION

Figure 1A:
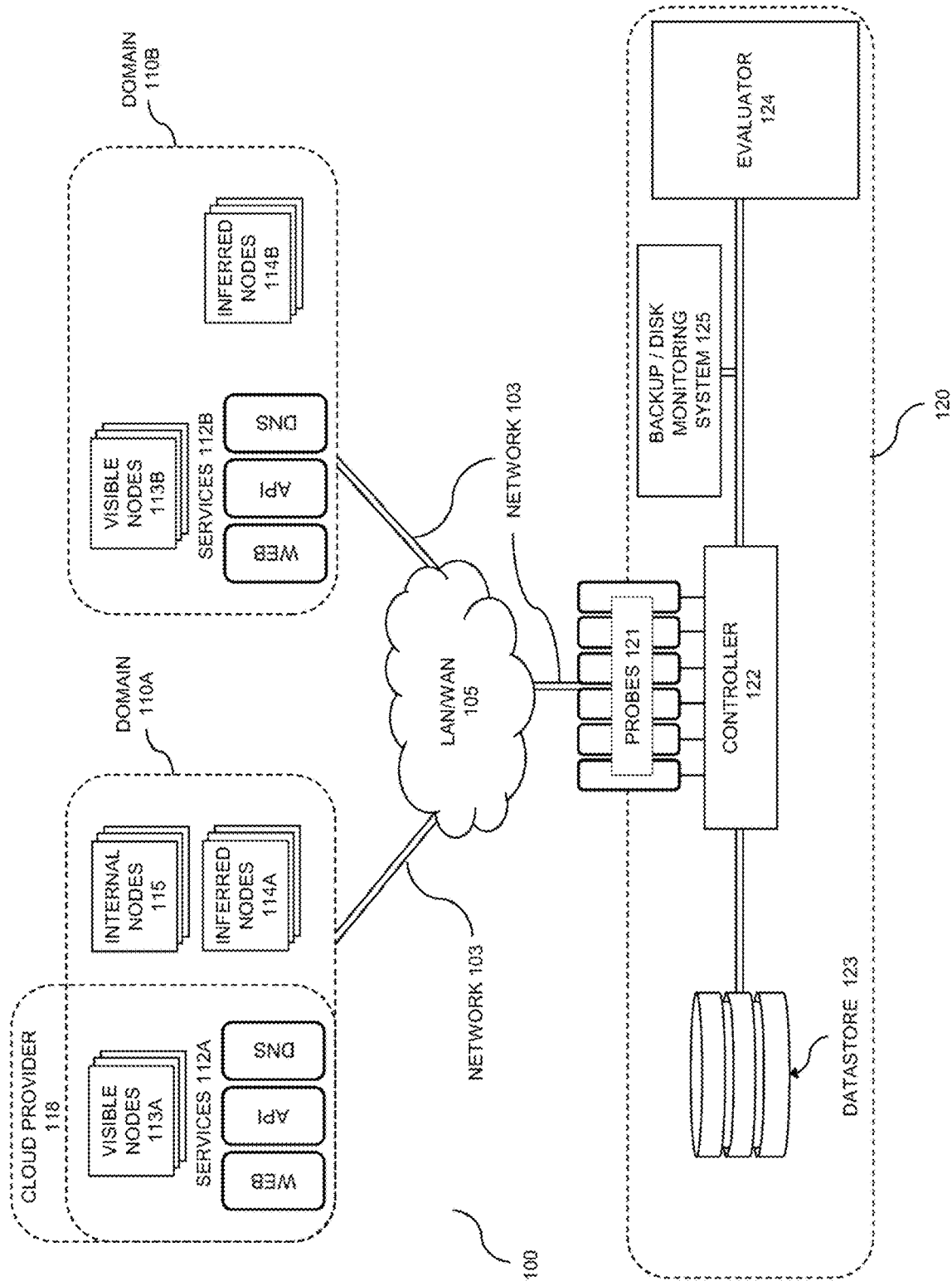
FIG. 1a is a schematic view illustrating a vulnerability measurement system and system context according to various embodiments.

In the following description, various embodiments of the claimed subject matter are described with reference to the drawings. In the following description, numerous specific details are set forth in order to provide a thorough understanding of the underlying innovations. Nevertheless, the claimed subject matter may be practiced without various specific details. In other instances, well-known structures and devices are shown in block diagram form in order to facilitate describing the subject innovation. Various reference numbers are used to highlight particular elements of the system, but those elements are included for context, reference or explanatory purposes except when included in the claim.

As utilized herein, terms "component," "system," "datastore," "cloud," "client," "server," "node," and the like refer to portions of the system as implemented in one or more embodiments, either through hardware, software in execution on hardware, and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The existence of various undiscussed subelements and subcomponents should be interpreted broadly, encompassing the range of systems known in the art. For example, a "client" may be discussed in terms of a computer having the identified functions and subcomponents (such as a keyboard or display), but known alternatives (such as a touchscreen) should be understood to be contemplated unless expressly disclaimed.

More generally, descriptions of "exemplary" embodiments should not necessarily to be construed as preferred or advantageous over other aspects or designs. Rather, use of the word exemplary is intended to disclose concepts in a concrete fashion.

Further, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

FIG. 1a shows a network context 100 including both various domains 110 (here represented by domain 110A and domain 110B) and a vulnerability measurement and evaluation system 120, all connected via network connections 103 through a LAN or WAN 105, here represented by the Internet cloud. The domains 110 are broader than simply the set of computers registered under a particular top level DNS domain name. Instead, the domain referred to is a domain of control, including the complete set of network-exposed or network-connected services and computers that are controlled by an organization. The organization in this case can be considered either expansively, such as to include affiliates, suppliers, and similar, so as to capture an entire chain of commerce, or it can be isolated down to a particular group that has a distinct network presence. For purposes of this disclosure, the concept of a domain will correspond to the "network-connected computers that in concert provide services associated with one business enterprise, primarily but not exclusively organized for interaction with the public through a single DNS top level entry," but this particular definition is not essential to the inventions disclosed herein. Various implementations and embodiments can use other definitions of a domain so long as it generally corresponds to the idea of a locus of control or a set of organized activities.

Looking at the domains 110A and 110B, there are many similarities but some distinctions as well. Both domains 110 have a set of explicit services 112A and 112B that are exposed to the public. These services may or may not require authentication, but there is some level at which a non-affiliated user can interact with the service. These services 112 include both common user-oriented services, such as a web service, common system-oriented services such as a DNS service, and other custom services, such as an API service. In practice, almost all services will be offered via one of a relatively small number of standard ports and protocols, either as recognized by the Service Name and Transport Protocol Port Number Registry as maintained by the Internet Assigned Numbers Authority (IANA) or as commonly recognized in the art. The list of protocols and their associated RFCs describing the interactions supported by those protocols as listed at https://www.iana.org/assignments/service-names-port-numbers/service-names-port-numbers.txt (or any later canonical URL for the Service Name and Transport Protocol Port Number Registry) are hereby incorporated by reference, both as a list of probe protocols and for the technical requirements for basic probing, such as to exchange a preliminary connection message.

In addition to the clearly identified and declared services 112, most domains will also have a set of visible nodes 113 that have assigned addresses, and may incidentally be running services capable of interacting with users outside the system, but may not be part of an official set of exposed services. In one embodiment, these nodes can be identified via DNS entries in the full zone record, a practice known as "subdomain enumeration." In another embodiment, the IP addresses or IP address ranges associated with a particular domain can be identified (either through grant, through recorded purchase, or through inference based upon the practices of a hosting entity) and the addresses can be enumerated, checking each one for a visible node, and checking each node for available services. These are known as "IP address sweeps" and "port scans" to those of skill in the art.

According to various embodiments, in many cases the action of the probes will serve to identify particular network nodes 114 that are required for the exposed functionality observable either through the services 112 or the visible nodes 113, but which may not be visible. Those nodes are referred to here as the "inferred nodes," as they are either required or highly likely to be present, even if they cannot be directly observed.

In some embodiments, the owner of the vulnerability measurement system may have privileged access to a domain, such as domain 110A, such as per a contractual arrangement. In that case, internal nodes 115 may also be able to be identified and probed via either an explicit listing of internal nodes or an IP address sweep and port scan. It is not expected that these internal nodes 115 will be visible in all circumstances. In some domains, such as domain 110B, these internal nodes 115 are not visible to the vulnerability measurement system 120 and so are not scanned.

In some embodiments, an initial evaluation of the system can identify the use of one or more cloud providers or datacenter management providers. In some embodiments, this can be identified through the use of particular IP address ranges, by tracing network paths to servers, or identifying the use of particular proprietary systems that are only offered to users of particular cloud services. For example, domain 110A is shown to have some of its services and visible nodes hosted on cloud provider 118.

Looking at the vulnerability measurement system 120, the system has four high-level components, each of which will be discussed in greater detail. Those components are the probes 121, the controller 122, the datastore 123, and the evaluator 124. In some embodiments, the vulnerability measurement system 120 may also include a backup/protection system 125. All of these are interconnected and function as part of a single system, but in most cases these different elements of the system will be hosted on different servers, as taps on the network, or, especially for the probes, as individual computers hosted at various places, some of which may only be instantiated briefly. For example, one particular probe may be co-located inside a domain if contractual arrangements allow, such as domain 110A, so as to see and evaluate the internal nodes 115. In other embodiments a probe can be instantiated at a particular cloud service provider or within a particular datacenter to provide enhanced or low-latency access to domain-controlled nodes for purposes of sweeps, scanning, and evaluation. While all the probes 121 are here shown as being co-located for explanatory purposes, they can in various embodiments be located as is most useful for the evaluation of any particular domain.

The controller 122 is the central "director" of the system as is implemented as a single information processing device or set of closely-cooperating information processing devices as described further herein. The controller 122 directs the action of all the other portions of the system as described.

The datastore 123 is a structured data storage, such that arbitrary data can be stored, but there are restrictions on the form or the content of the data to allow superior searchability, relationality, or programmability. The datastore is used to store the information points identified by the probes and to index them by the time received as well as according to other dimensions as discussed further herein. In various embodiments, the datastore 123 can be a SQL or NoSQL database. In many embodiments, the datastore 123 will be used to store time-sequenced data. While the storage and processing of time-sequenced data does not require any particular structure or API to be provided by datastore 123, the temporal nature of the stored data can be exploited in many cases to provide faster or easier access to both individual event streams or data aggregates organized by accumulating events within a particular time window. Datastores that provide these specialized structures are frequently referred to as "time series databases." The data series stored by a time series database are called profiles, curves, or traces. In some embodiments, one implementation of a time series database uses a SQL-based relational database that supports both binary large objects (BLOBs) and user-defined functions. SQL statements that operate on one or more time series quantities on the same row of a table or join are written as user-defined time series functions that operate inside of a SELECT statement. Efficiency is often improved if time is treated as a discrete quantity rather than as a continuous mathematical dimension. For the purposes identified herein, the relevant timeframes are in terms of minutes, hours, and days, so high-precision time is not needed.

The evaluator 124 is a set of information processing systems that work together to create and update a model correlating the data retrieved from the a probes, either instantaneously or based upon the stored traces from the datastore 123, and to provide an evaluation of risk as further described herein. In some embodiments, the evaluator uses techniques that are generally grouped in the area of "machine learning." Machine learning is a term of art that encompasses a number of related but distinct techniques. These various techniques can be thought of as ways to map a complex set of inputs onto a set of outcomes through the creation of a (typically) differentiable manifold describing the correspondence between the input and output spaces. This manifold is typically referred to as the "model" for a particular problem. A number of different techniques are used to create models: rule-based methods, probabilistic methods, and various types of neural-network based methods, including Convolutional Neural Networks (CNNs), Recurrent Neural Networks (RNNs), Restricted Boltzmann Machines (RBMs), and other types of multi-node weighting architectures wherein an objective function is "learned" by iteration, backpropagation, or a similar technique. These neural networks may include various types of cells, such as Long Short-Term Memories (LSTMs), Gated Recurrent Units (GRUs), Feed Forward and Recurrent Cells, Convolutional Cells, and similar.

A basic neural network cell connects to other cells (sometimes call "neurons") via weights. Each connection has its own weight, which may be positive, negative, or zero, and may vary in size considerably. Many times initial cell weights are assigned randomly. The value of each of the cells that a basic cell is connected to is multiplied by its respective connection weight. The resulting values are all added together. In some implementations, a bias is also added. The bias is also a number, sometimes constant (often −1 or 1). This total sum is then passed through an activation function, the resulting value of which then becomes the value of the cell.

Convolutional cells are similar to feed forward cells but they are typically connected to a smaller number of cells from the previous layer, usually those in spatial (or other) proximity. This allows the identification and preservation of localized information. Deconvolutional cells take a weight and "expand" it to a number of cells in a context in the next layer.

Pooling and interpolating cells are cells that implement a mathematical operation on a cell or group of cells. Pooling cells take in the incoming connections and have a function which determines what information gets passed through. Interpolating cells perform the opposite operation: they take in some information and generate more information based upon the initial value and the context Mean and standard deviation cells are used to represent probability distributions. The mean is the average value and the standard deviation represents how far to deviate from this average (in both directions).

Recurrent cells have connections not just from the previous layer, but from previous iterations of a time-based analysis or time-based series. They can also be connected to themselves to use their own prior values as an input to a new value, although in each case the value associated with earlier inputs is diminished.

LSTM cells are logic circuits, storing four values: the current and last value of the output and the current and last values of the state of the "memory cell". They have three "gates": input, output, forget, and they also have just the regular input. Each of these gates has its own weight meaning that connecting to this type of cell entails setting up four weights, each of which controls the amount of information flow associated with each input. The incoming information is multiplied by a scalar, usually ranging from 0 to 1, stored in the gate value.

GRUs are a variation of LSTM cells, but with two gates—one for update and one to reset. GRU cells do not have a hidden cell state protected by an output gate, and they combine the input and forget gate into a single update gate.

In various neural network architectures, various cells are connected to form flow graphs connecting various inputs to various outputs. As noted above, many times the initial weights for each cell are randomly assigned. The different types of neural architectures are designed by connecting cells into groups, and layers, and using feedback-based updating to modify the connections between various groups or layers to independently map various inputs to various outputs.

The quality or correctness of a model is captured relative to how well it performs on a particular task. Classification tasks map inputs to one or more classes of outputs based upon their features. Clustering is a related task, where a set of inputs is divided into groups, where the group definitions are learned in the process of making the model. Regression tasks identify the relationship between variables, and density estimation finds the distribution of inputs in a particular space.

One aspect of a model is that as a mapping of many-valued inputs to many-valued outputs, it is not limited to discrimination between existing inputs, but can be used to predict the mapping of a new, never-before seen input to the set of outputs given the model. In this sense, the model has "learned" from a set of past experiences to associate a particular new input with its correct output. For some important problems, this "correct" output cannot be fully anticipated, except as a distribution of possible correct outcomes. In this case, the model maps multi-dimensional inputs onto a distribution of possible outputs, and the "correct" model is the one that minimizes the error between the distribution of the generated, expected outputs and the distribution of the observed set of outputs.

In many embodiments, the evaluator will take the form of one or more neural network architectures as discussed in more detail below. As disclosed herein, the use of particular architectures is disclosed according to the best known mode at the time of disclosure, but the implementations herein are not limited to the particular modes identified, and better evaluators can be substituted for the ones identified herein based upon their performance vis-à-vis the objective function. Further, other architectures, such as a multinomial naïve Bayes, are also contemplated. In at least one embodiment, multiple different architectures are grouped using an "ensemble" methodology, with the outputs of the different architectures themselves subject to weighting based upon their observed success on problem subtypes in the past.

In some embodiments, the vulnerability measurement system will also include other types of probes, such as backup and protection system 125 (such as that disclosed in co-pending application U.S. Ser. No. 15/885,777) acting on various monitored systems within a domain 110. This embodiment is included to show that almost any type of observation system can be used to gather information regarding the implementation and maintenance of monitored systems, making the overall evaluation of vulnerability risk more efficient and effective. In some embodiments, an organization purchasing insurance may want to provide privileged access to its systems and use systems such as backup and protection system 125 to reduce their vulnerability "score" and improve their cyber insurance pricing.

Figure 1B:
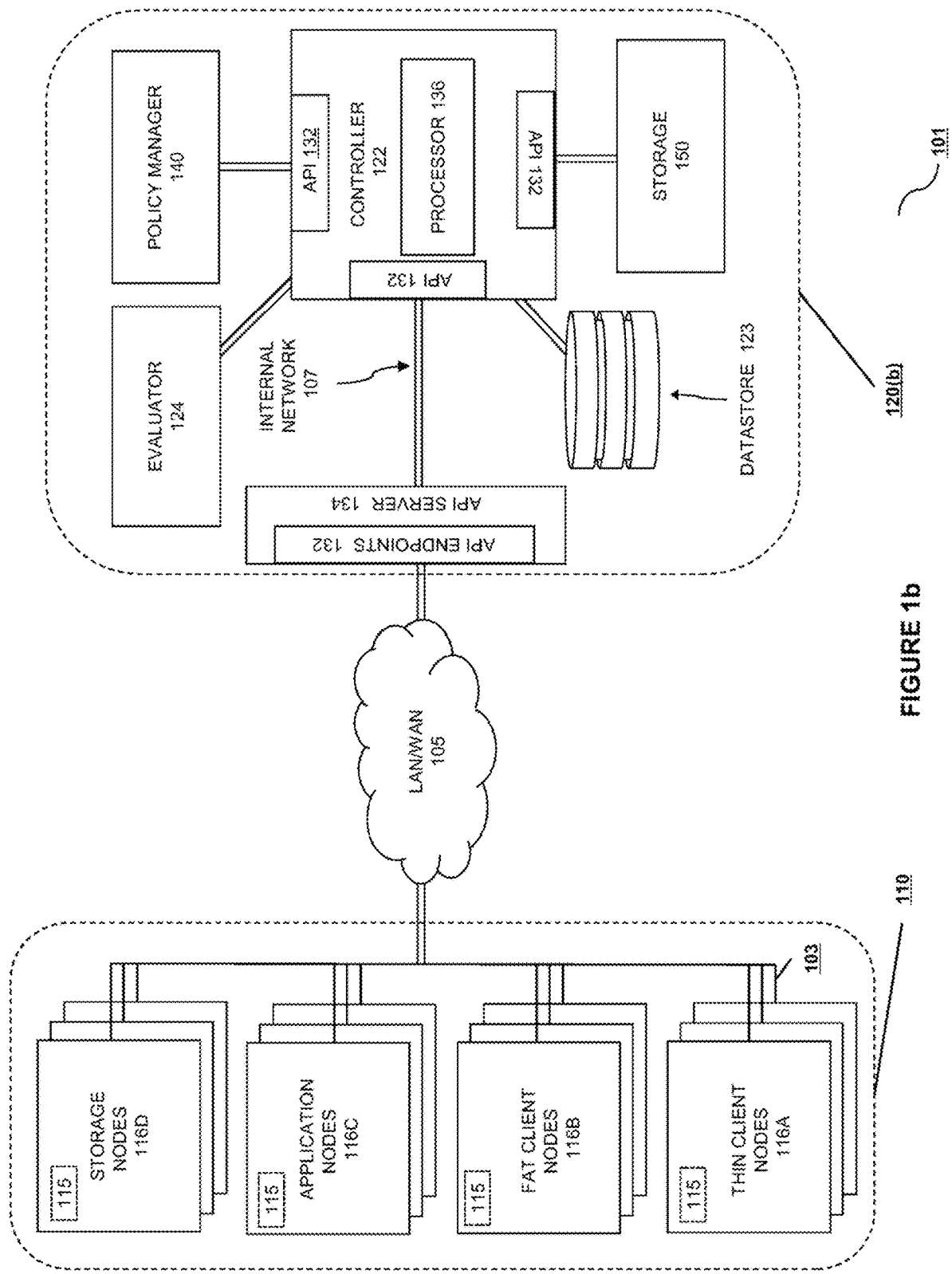
FIG. 1b is a schematic view illustrating another embodiment of a vulnerability measurement system and system context according to various embodiments.

Turning to FIG. 1b, an alternate embodiment of system 120 is shown in the context 101. The context 101 is generally the same as the context 100 as described in FIG. 1a, but some elements have been either expanded upon or removed for explanatory clarity.

Looking at FIG. 1b, the nodes within a domain 110 are further identified by type. As shown in FIG. 1b, these are labeled as being internal nodes 115, although the same type of groupings generally apply to all types of nodes identified in a domain 110. Further, although the two systems are each drawn inside of a particular "box" that shows their logical grouping, there is no implied physical grouping. The monitored systems may be in one or more physical locations, the vulnerability monitoring systems may be in one or more physical locations, and the protecting and monitored systems may be co-located or not. There are network connections 103 shown connecting the monitored systems with each other, both those connections are exemplary only; the only necessary connection is to the vulnerability measurement system 120 via LAN/WAN 105.

The internal systems includes a variety of information processing systems grouped into "thin client" nodes 116A, "fat client" nodes 116B, "application" nodes 116C, and "storage" nodes 116D. Each of the information processing systems 112, 114, 116, and 118 is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The distinctions between the different types of nodes has to do with the manner in which they store, access, or create data. The thin client nodes 112 are designed primarily for creating, viewing, and managing data that will ultimately have its canonical representation maintained in some other system. Thin client nodes 112 may have a local storage, but the primary data storage is located in another system, either located within the protected organization (such as on a storage node 118) or in another organization, such as within the protecting organization 120 or within some third organization not shown in the diagram. Fat client nodes 114 have a local storage that is used to store canonical representations of data. An application node 116 hosts one or more programs or data ingestion points so that it participates in the creation of new data, and a storage node 118 includes storage services that are provided to other nodes for use. Either an application node 116 or a storage node 118 may or may not be the location of a canonical representation of a particular piece of data. Note that the categories of nodes discussed above ("fat client," "thin client," "application," and "storage") are not exclusive, and that a particular node may be a fat client in certain circumstances or with reference to certain data, a thin client in other circumstances and for other data, and likewise an application or storage node in certain circumstances or for certain data. These different roles may take place serially in time or contemporaneously. Certain embodiments may also benefit from optional agents 111, which may be associated with any type of node and which are command processors for the protection system 120. In addition, the term "node" is not necessarily limited to physical machines only, and may include containers or virtual machines running on a common set of underlying hardware by means of a hypervisor or container management system, where the hypervisor can itself be a "node" and the managed virtual machines or containers are also optionally "nodes."

In the alternate embodiment shown in FIG. 1b, various details of one internal system architecture are shown as system 120(b). At the network ingestion point there is an API endpoint 122 with a corresponding API server 124. Although this has been drawn in the singular, there may be more than one API endpoint 122 on each API server 124, and there may be more than one API server 134. These API servers 134 may be combined to provide additional robustness, availability, data isolation, customer isolation, or for other business or technical reasons. The API server 134 may perform appropriate error checking, authorization, or transformation on any information or call that comes in via API endpoint 132 prior to passing the call or data to controller 122, implemented either as an information processing system, a process, subprocess, container, virtual machine, integrated circuit, or any combination of the above. In various embodiments, controller 122 interacts with other components via internal APIs 132, and it may include a dedicated processor or subprocessor 136. The controller 122 implements the vulnerability measurement code and monitors the state of the monitored systems, taking action when necessary. The processes and methods described herein are implemented by or on controller 122, in conjunction with other special-purpose elements of the vulnerability monitoring system. In various embodiments these can include a policy manager 140, a storage 150, or a datastore 123. The policy manager 140 is a processing element including specific-purpose code and/or hardware enabling it to efficiently model business or security policies in a logical form and evaluate compliance with those policies on an ongoing basis. The storage 150 can be an internal component, a single system, or multiple systems providing a method for safely storing and retrieving arbitrary bit sequences. These bit sequences can be internally represented as objects, as a bit/byte array, or as a log-structured or tree-structured filesystem. Various storages may support multiple access methods to facilitate ease of use.

Figure 2A:
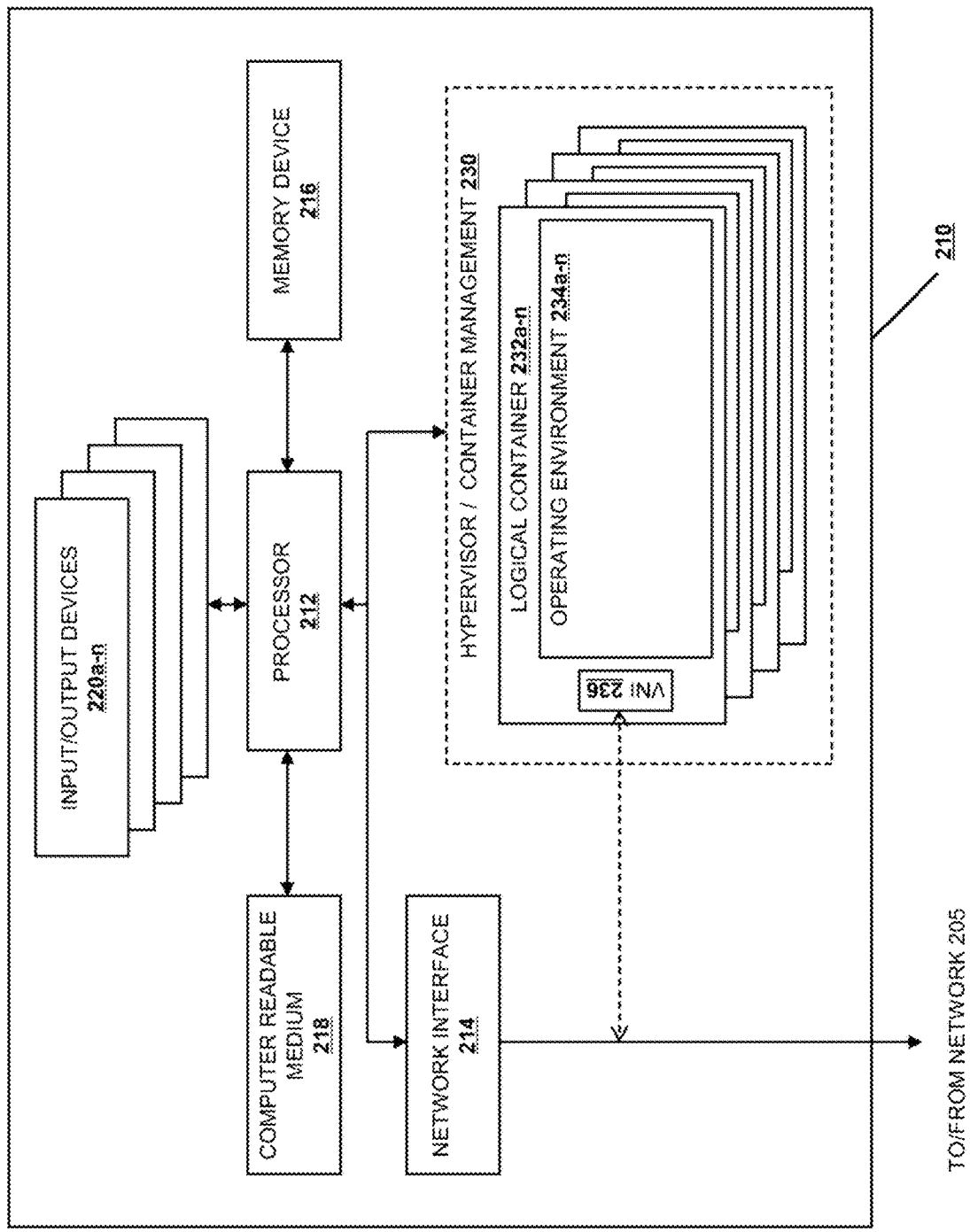
FIG. 2a is a schematic view illustrating an information processing system as used in various embodiments.

FIG. 2a shows the details of an information processing system 210 that is representative of, one of, or a portion of, any information processing system as described above. The information processing system 210 may include any or all of the following: (a) a processor 212 for executing and otherwise processing instructions, (b) one or more network interfaces 214 (e.g., circuitry, antenna systems, or similar) for communicating between the processor 212 and other devices, those other devices possibly located across the network 205; (c) a memory device 216 (e.g., FLASH memory, a random access memory (RAM) device or a read-only memory (ROM) device for storing information (e.g., instructions executed by processor 212 and data operated upon by processor 212 in response to such instructions)). In some embodiments, the information processing system 210 may also include a separate computer-readable medium 218 operably coupled to the processor 212 for storing information and instructions as described further below. In one or more embodiments, the information processing system 210 may also include a hypervisor or container management system 230, the hypervisor/manager further including a number of logical containers 232a-n (either virtual machine or process-based), each with an associated operating environment 234a-n and virtual network interface VNI 236a-n. Note that an information processing system can perform many roles—including as a server, desktop, mobile device (such as a phone), router, switch, firewall, or application server.

Returning to the probes identified relative to reference 121 in FIG. 1a, the schematic diagram shows a number of independent entities. This is to represent the large number of potential probes available, and to emphasize that each type of probe will be used to collect a different type of information. It is also expected that these probes would be run multiple times, not just to create a baseline, but also to identify new nodes in a domain and to track changes and responses embodied by changes to the software and configurations exposed to the public. For example, in various embodiments the probes 121 include the following:

Operating System Fingerprinting and Identification.

Different operating systems can be identified through what are known as reconnaissance probes. These are typically performed at the lower levels of the protocol stack, typically as TCP connect, SYN, and UDP scans. Despite the high level of standardization in low-level protocols, underlying implementation details leak through and can collectively be used to identify not only operating systems but particular versions of kernel and non-kernel software. Each type of device has a stereotypical network fingerprint, both in terms of its TCP/IP implementation and performance, as well as its responses to various standardized probes. In various embodiments, TCP timestamp options, the size of the TCP window, the Maximum Segment Size, Explicit Congestion Notification messages, the ID field and Don't Fragment bits associated with standard TCP can all be used to identify an operating system and version. Similarly, ICMP packet handling, specifically error messages, including Parameter Problem Messages, vary between implementations and can be used to identify a host. In addition, at least some embodiments use ICMP echo packets (as used in traceroute) to identify non-terminal network infrastructure that is controlled by the domain. Because this information is associated with ongoing site vulnerability evaluation, special attention can be paid to non-traditional nodes as well, such as printers or commercial non-professional wireless access points. In various embodiments, nmap ("Network Mapper"), TCPDump, Xprobe2, pOf, and similar software can be used to implement or supplement operating system and version probes. In various embodiments, this can be used to identify the roles played by various information processing systems (desktops, mobile devices, servers, routers, or firewalls).

Network and Domain Location Analysis.

In various implementations, one type of probe uses traceroute (ICMP ping responses) to trace network connections through the network. By identifying when packet paths intersect with the target domain, the physical location (and sometimes the exact datacenter) can be inferred. In another embodiment, whois, dig, and nslookup information is used to identify IP address blocks associated with the domain and various enumerated subdomains. These IP address blocks can then be identified within ARIN or other similar IP address registries to find the associated organizations responsible for managing the IP address block. When combined with subdomain enumeration, these techniques can be effective to find portions of a domain that are hosted within a particular cloud provider or service provider (such as cloud provider 118) or to find services that are hosted by the organization itself rather than through a different provider.

Web Scraping.

A "web scraper" is a system, headless or based upon GUI automation, that downloads the information available via HTTP, HTTPS, or another similar protocol. Web scrapers are typically split into two parts: a "fetch" process and one or more analytical processes. Fetching is the downloading of a page or other data from a website or HTTP API. The fetched data is then subject to one or more analytical processes, each designed to extract a targeted type of data. In various embodiments, the analytical processes include text pattern matching, HTML parsing, DOM parsing, semantic evaluation, computer vision web-page analysis, and the execution of JavaScript or other client-side code.

HTML and JavaScript Analysis.

Various applications used to serve, author, or provide functionality for web pages or other possible Internet-connected services leave clues that identify their use. Many of these types of technologies are "injected" into the web page for execution by the client, making their identification straightforward. For example, For example, one probed domain used the following analytics and tracking technologies, visible through their traces in the HTML provided:

VoiceFive (A global market research company that studies and reports on Internet trends and behavior.)

Nielsen/NetRatings (Examines website performance, usage trends, content and product placement, audience circulation, visitor loyalty, search engine performance and visitor behavior.)

Facebook Domain Insights (Javascript that allows website administrators to see Facebook Insights for the domain.)

Effective Measure (Digital Audience Measurement, website rankings, internet demographics and market intelligence for website publishers, media agencies and digital marketers.)

Omniture SiteCatalyst (Provides the website with actionable, real-time intelligence regarding online strategies and marketing initiatives.)

comScore (Market research company that studies internet trends and behavior.)

Lotame Crowd Control (Data driven marketing advertising program provides social media sites with advance targeting.) Chartbeat *Live traffic monitoring of a website.)

Google Analytics (Analytics of many different user and website behaviors.)

Barlesque (Used to lay out and organize pages.)

Maxymiser (Input for business decisions through customer insight.)

Visual Website Optimizer (A/B, split and multivariate testing software.)

Everest Technologies (Performance testing and channel strategy provider for eCommerce.)

Datalogix (Uses purchase-based audience targeting to drive measurable online and offline sales.)

InsightExpress (Digital marketing research and measurement of advertising effectiveness across online, mobile and other media.)

Rapleaf (Marketing automation tools.)

LiveRamp (CRM Retargeting & Data Onboarding app.)

Another domain used the following "widgets" provided by third party developers that were then directly embedded in the domain pages, using Javascript or HTML:

Stumbleupon (Website discovery app—widget provides ability to submit the site to StumbleUpon.)

Reddit (Community discussion site—widget provides Reddit voting capability.)

Digg (Community discussion site—widget provides submission capability.)

Del.icio.us (Social bookmarking site—embeds bookmarking and referral capability.)

Twitter Timeline (Adds tweets, favorites or searches as a timeline to the website.)

Pinterest (Provides content from the social image sharing website Pinterest.)

FastClick (Polyfill to remove click delays on browsers with touch UIs.)

Facebook Share (Social networking site—widget provides "Like" and share capability.)

Facebook Workplace (Group discussion, a personalized News Feed, and voice and video calling from Facebook.)

Adobe Connect (Adobe Connect web conferencing software offers online meeting functionality, virtual classrooms and large scale webinars.)

WhatsApp (WhatsApp protocol links—opens WhatsApp on mobile device when clicked.)

Apple Smart App Banner (Displays a banner that provides a direct link to an Apple Store app, or opens the app if the user already has it installed.)

Getty Images (Stock photo site—includes images from Getty.)

Shutterstock (Stock photo site—includes images from Shutterstock.)

Alamy (Stock photo site—includes images from Alamy.)

This information is provided to evaluator 124 as an input both relative to its direct use as well as to provide a source of data related to other inferred risks. For example, the use of Facebook comments by a domain also indicates that there is user data shared between Facebook and the domain, indicating that the risk of data breaches at Facebook is correlated with the loss of business information on the domain as well.

Application Fingerprinting and Identification.

Certain types of web software will provide "banners" or other identifying information in response to certain types of probes. For example, many web application frameworks will include "generator" information as non-displayed information in the headers or comments within a page. In another example, an attempt to reach a non-existent webpage will typically return a "404" error page, many of which include text identifying the particular software used to generate the error or to serve the page.

More generally, patterns associated with HTML and URL generation can also be used to fingerprint particular types of web application frameworks. Even if the name of the framework is not included in the content delivered via web scraping (as it frequently is), there are patterns associated with common web technologies such as Magento, Wordpress, Spring, Struts, Django, and other web application frameworks. In various embodiments these patterns are used to identify web management and generation frameworks.

Information about a domain's vulnerability posture can also be inferred from other information revealed through its Internet-accessible interfaces. For example, the extension ".php" in a URL is strongly indicative of the use of the PHP language, which has a particular security track record, and is moderately indicative of the use of a Unix or Linux-based server operating system. The use of a ".asp" is indicative of a Windows operating system and an older (1999-2008)-based web application framework, whereas ".aspx" is indicative of a Windows operating system and a post-2008 web application framework. These types of traces are effective even if the content being delivered is exactly the same.

In the context of operating system, node type, or application fingerprinting, this information can also be used to make appropriate inferences or further rule in or rule out other types of probes. For example, IIS exploits will not be effective on an Apache or Nginx server, and Sendmail vulnerabilities are applicable to an Exchange server. Similarly, information about a particular web application framework can be used to identify the existence of inferred nodes 114. For example, the "WordPress" application framework requires the use of a MySQL database, even if that database is not externally visible. This allows the inference of a "MySQL" server node as part of the inferred nodes 114, even if such a node is not immediately visible.

Active Vulnerability Scanning.

In various embodiments, various probes will use code engineered to trigger known or possible "exploits"—vulnerabilities—in order to identify the existence of security weaknesses. In one embodiment, this is accomplished through the use of Metasploit, a multiple-exploit scanning and execution tool used for both security vulnerability scanning as well as targeted invasions. While it is not anticipated that a probe will take advantage of any particular vulnerability, the existence of vulnerabilities and the speed at which they are patched are both key pieces of information needed to establish an ongoing vulnerability score.

In another embodiment, any connections accessible by the probe 121 are scanned using a fuzzing tool. A fuzzing tool is a tool that creates intentionally out-of-specification requests in order to identify weaknesses in input processing.

Business Information Probes.

One type of probe 121 is not addressed at the domain itself, but at business information associated with the domain. These sources of business information include whois databases, business information databases (such as Martindale-Hubble, Lexis, Bloomberg, or similar databases) or public filing information (such as those accessible through the SEC's Edgar interface). In one embodiment, the information collected by these business information probes include a) the type of business associated with the domain, according to standard business type classifications; b) the size of the business; c) the age of the business; d) the age of the organization's Internet activity (as measured through Netcraft or similar surveys, the existence of ongoing web archive results, and the registration age of particular domains.

Configuration Probes.

Several embodiments collect and use information about configurations supported by the software interfaces exposed to the network, even if those configurations are not explicitly vulnerable. In various embodiments, this includes version information, supported options (as identified through protocol negotiation), and available flags. For example, in one embodiment, the available cipher suites associated with an HTTPS connection are recorded. Part of the information stored as a result of that probe may be both the exact cipher suites, but also an automated evaluation of the security posture implied by those cipher suites—either prioritizing compatibility, prioritizing the strongest capable cyphers, or whether the cipher suite has been modified at all (indicating a likelihood that there is less active administration of the domain). In another embodiment, the PHPinfo( ) function is called if a page using it is found. This function returns a list of the modules compiled into the PHP executable, allowing an evaluation of both used and unused functionality as well as a note that an information-leaking capability was exposed to the network.

Non-Domain Specific Probes.

One other type of probe relates to software vulnerabilities and capabilities generally as opposed to the specifics of a domain. For example, one embodiment of the system uses CVE reports and categorizes them according to their severity as well as the identity of the underlying technology. In one embodiment, this information is gathered through the probe interface, although there is no specific need for it to do so. Using the probe interface just allows the reuse of various information-gathering agents and routines for storage and correlation by the evaluator 124.

Each probe's information is stored in the datastore 123. In some embodiments, information that may be of future use due to different parsing techniques may also be stored in storage 150. In this manner, an embodiment using storage 150 can record raw data as well as parsed and evaluated data, so that future evaluations can look at the traces that were generated at a previous point in time.

Some of the active scanning by the probes 121 may be unwelcome in certain cases. Although some implementations will only scan domains where there is a monitoring agreement, some probes may be temporarily established via a virtual machine or container, run briefly, and then exit and be discarded.

In many embodiments, the information gathered by the probes 121 is collected many times to create a set of traces identifying changes in a domain's implementation and security posture over time. In various embodiments, this information is gathered on a daily basis. For other types of information, the refresh frequency can be either weekly, or at some other regular interval. This is used not only for judging point in time risk (has the router been patched to fix the latest exploit), but it is possible to infer information about the technology culture, choices, and processes that lead to particular choices and the amount of time a particular domain may spend with older, unpatched, or other out-of-specification software.

In one embodiment, the vulnerability monitoring system uses an agent (such as agent 111 discussed relative to FIG. 1) to observe and record changes, with those changes being recorded either locally or by the vulnerability monitoring system 120 in the storage 150 or the datastore 123. In another embodiment, changes to files requested by the client node, especially those with canonical representations in locations other than the monitored node, are captured as network traffic either on network 103 or based on an agent or interface associated with the storage system holding the canonical representation. Generally, there are a number of methods of capturing and recording user data already known in the art, such as those associated with backup, monitoring, or versioning systems. These various capturing and recording systems for automatically capturing user data and changes made to user data can be included as an equivalent to the agent 111 and capturing functionality associated with the vulnerability monitoring system.

FIGS. 2*b* and 2*c* show two embodiments of a monitoring system 125 referred to in FIG. 1*a*. In this case, the probe 121 records file and disk changes as inputs. FIG. 2*b* is an implementation of an agent system (as with agent 111) used in various embodiments and FIG. 2*c* is an implementation of an agentless system as used in various embodiments. The agented system may be used in situations where there is the ability to place software or hardware on the systems inside a domain 110, whereas the agentless system does not require the same. As noted, the backup/disk monitoring system 125 is also a type of probe 121 as discussed previously, but is described herein in greater detail because of the requirement for additional components to achieve its purpose.

Turning to FIG. 2*b*, the agent subsystem is shown at reference 240. In an embodiment that uses an agent present on the information processing system, the agent 252 is interposed as a filter or driver into the filesystem driver stack 250. In one embodiment, this is a kernel extension interposed between the kernel and filesystem interface. In another embodiment, it is a filesystem driver that actually "back-ends" to existing filesystem drivers. In a third embodiment, there is no kernel or filesystem driver, but the agent is a user-space process that listens to kernel I/O events through an API such as the inotify API. Another embodiment may simply be a process that "sweeps" the disk for new changes on a regular basis. Each of these embodiments has advantages and drawbacks. Implementations that interface with the kernel are more likely to be resistant to change by malware, but may also have higher overhead. Embodiments in user space may be easier to deploy.

Assuming an embodiment that uses a filter driver, all file-oriented API requests being made by various processes 242*a-c* are intercepted by the agent filter 252. Each process reading and writing is viewable by the agent, and a "reputation" score can be maintained for each process on the basis of its effects on the user's data. For each API request, the ordinary course of action would be to send it to one or more backend drivers simultaneously. A trusted change can be sent directly through the filesystem driver 254*a* to the disk storage 262. Changes that have some probability of user data damage are sent through shadow driver 254*b* to scratch storage 264, which provides a temporary holding location for changes to the underlying system. Changes in the scratch storage can be either committed by sending them to the disk storage 262, or they can be sent to the vulnerability monitoring system at 266, or both. This allows the permeability of changes to be modified on a per-file, dynamically changing basis. It also allows changes to user data to be segregated by process, which can assist in the identification and isolation of malware, even though the malware process itself is not being sampled or trapped. It also allows the vulnerability monitoring system to keep a log of the changes to the file on a near-real-time basis, and keep either all changes or those deemed significant.

In an implementation that does not intercept all file-oriented API requests being made by the processes 242*a-c*, the agent process instead follows closely behind each change. In one embodiment, this is done by sampling from lsof ("list open files") or a similar utility and listening for filesystem change events. Processes can be associated with changes to individual files through the combination of information provided and each change can then be sent to the vulnerability monitoring system as in the previously discussed filesystem filter driver embodiment. Scratch files can be kept in a separate location either on or off the monitored system. Although the data permeability on the client system may be higher, the permeability of harmful data changes into the storage areas managed by the vulnerability monitoring system can still be kept low.

FIG. 2*c* shows one implementation of an "agentless" system. A node of the monitored system is identified at reference 270. Because there is no resident agent on the system, local filesystem changes by processes 242*a-c* are committed directly to the local disk storage 262.

Because the vulnerability monitoring system does not have an agent resident on the protected node 270, there are a collection of remote monitor processes, shown generally as the dotted box at reference 280. In this embodiment, there are two primary methods of interacting with the system. The first is the administrative API 274, which is built in to the operating environment on protected node 270. This administrative API allows the starting and stopping of processes, the copying of files within the system and over the network connection 276, and other administrative actions. The monitor/administrative interface 282 interacts remotely with the administrative API to read file changes and make copies of files to the scratch storage 264 or to send information to the vulnerability monitoring system 266 to implement the protections as described further herein. The second primary method of interacting with the protected node 270 is by monitoring external network traffic via proxy 284. Interactions with file storages and APIs are intercepted and provided to the monitor 282. In this case, the proxy acts similarly to the filesystem filter driver as described relative to FIG. 2*b*, but for remotely stored user data.

An alternative agentless implementation uses network tap 285 instead of proxy 284. A network tap is a system that monitors events on a local network and in order to analyzing the network or the communication patterns between entities on the network. In one embodiment, the tap itself is a dedicated hardware device, which provides a way to access the data flowing across a computer network. The network tap typically has at least three ports: An A port, a B port, and a monitor port. A tap inserted between A and B passes all traffic through unimpeded in real time, but also copies that same data to its monitor port, enabling a third party to listen. Network taps are commonly used for network intrusion detection systems, VoIP recording, network probes, RMON probes, packet sniffers, and other monitoring and collection devices and software that require access to a network segment. Use of the tap for these same purposes can be used to provide enhanced security for the monitored system 270. Taps are used in security applications because they are non-obtrusive, are not detectable on the network (having no physical or logical address), can deal with full-duplex and non-shared networks, and will usually pass through or bypass traffic even if the tap stops working or loses power. In a second embodiment, the tap may be implemented as a virtual interface associated with the operating system on either the protected or vulnerability monitoring systems. The virtual interface copies packets to both the intended receiver as well as to the listener (tap) interface.

Many implementations can use a mixture of agented and agentless monitors, or both systems can be used simultaneously. For example, an agented system may use a proxy 284 to detect changes to remotely stored user data, while still using a filter driver to intercept and manage locally stored data changes. The exact needs are dependent upon the embodiment and the needs of the monitored system. Certain types of protected nodes, such as thin client nodes 112, may be better managed via agentless approaches, whereas fat client nodes 114 or application nodes may be better protected via an agent. In one embodiment, storage nodes 118 may use an agent for the storage nodes' own files, whereas a proxy is used to intercept changes to user files that are being stored on the storage node 118 and monitored for protection.

Various embodiments of a system for identifying and evaluating vulnerability risk will be discussed in the context of the system as disclosed above. Moving temporarily to the problem of risk, it there are various ways to measure the risk and exposure associated with actual or potential customers. Those in charge of underwriting evaluate statistical models associating the characteristics of the client (or potential client) with historical claims to decide how much coverage a client should receive, how much they should pay for it, or whether even to accept the risk and provide insurance or some other type of guarantee. Putting aside the investment value of money, the difference in profits between two otherwise identical companies relates to the ability to accurately model and price the risk associated with a particular client or group of clients so that the amount paid on claims does not exceed in aggregate the amount collected.

Underwriting in general models various types of insurable parties as being subject to a random events, with the expectation that the cost associated with a particular risk will may be high in a particular case but will be low enough over the population of insured parties to spread to protect the company against excessive claims. Each organization providing insurance or a similar type of guarantee has a set of underwriting guidelines informed by statistical tables to determine whether or not the company should accept the risk. These statistical tables measure the cost and frequency of different types of claims based upon the categorization of the insured entity according to a number of different criteria, each of which has been shown to have an effect on the frequency or severity of insurable events. Based upon an evaluation of the possible cost of an event and an estimation of the probability of the event, the underwriter decides what kind of guarantees to provide and at what price.

As referred to above, there are similarities to the concept of a "credit score" as a point-in-time and ongoing risk evaluation measure, particularly in the sense that a credit score takes both instantaneous data (e.g., the amount of money currently owed, the amount of credit currently available) and uses time-series data (the history of payments, the history of defaults) to identify a single value that is associated with the best guess of a future chance of financial default. In the current disclosure, the model identifies both instantaneous information (the technology choices made by an organization, the size of the organization, the number of domain endpoints, the industry, the existence of known exploits or flaws in deployed software) and combines that information with historical data (e.g. the time to patching of vulnerabilities, the change or "turnover" associated with key systems, the change over time in configurations) to identify a number that is a "vulnerability score," statistically correlated with an enterprise's future chance of business disruption or loss of value due to technological causes.

Thus, while there exist in the prior art various statistical models of risk, there are two significant difficulties associated with applying different models of risk to business activities, particularly those associated complex systems such as the monitored systems described herein as well as the interactions that may lead to different types of losses. First, the systems are too dissimilar to create effective cross-organization models of risk, and second, the possible perturbing factors associated with the risk are so numerous as to be essentially unknowable or susceptible to human analysis. This results in mispriced risk models that either do not effectively mitigate the risk associated with different types of loss events, or are too expensive for the coverage received, or both.

In contrast to human-oriented forms of risk analysis, however, whole-system risk can be evaluated for an individual organization by correlating data access and change patterns with business flows and processes. The economic value of those processes can be evaluated, and regression analysis used to isolate and estimate the additive or subtractive value of each type of change, thus allowing the creation of a dynamic risk pricing model that is tailored to an individual organization.

Figure 3:
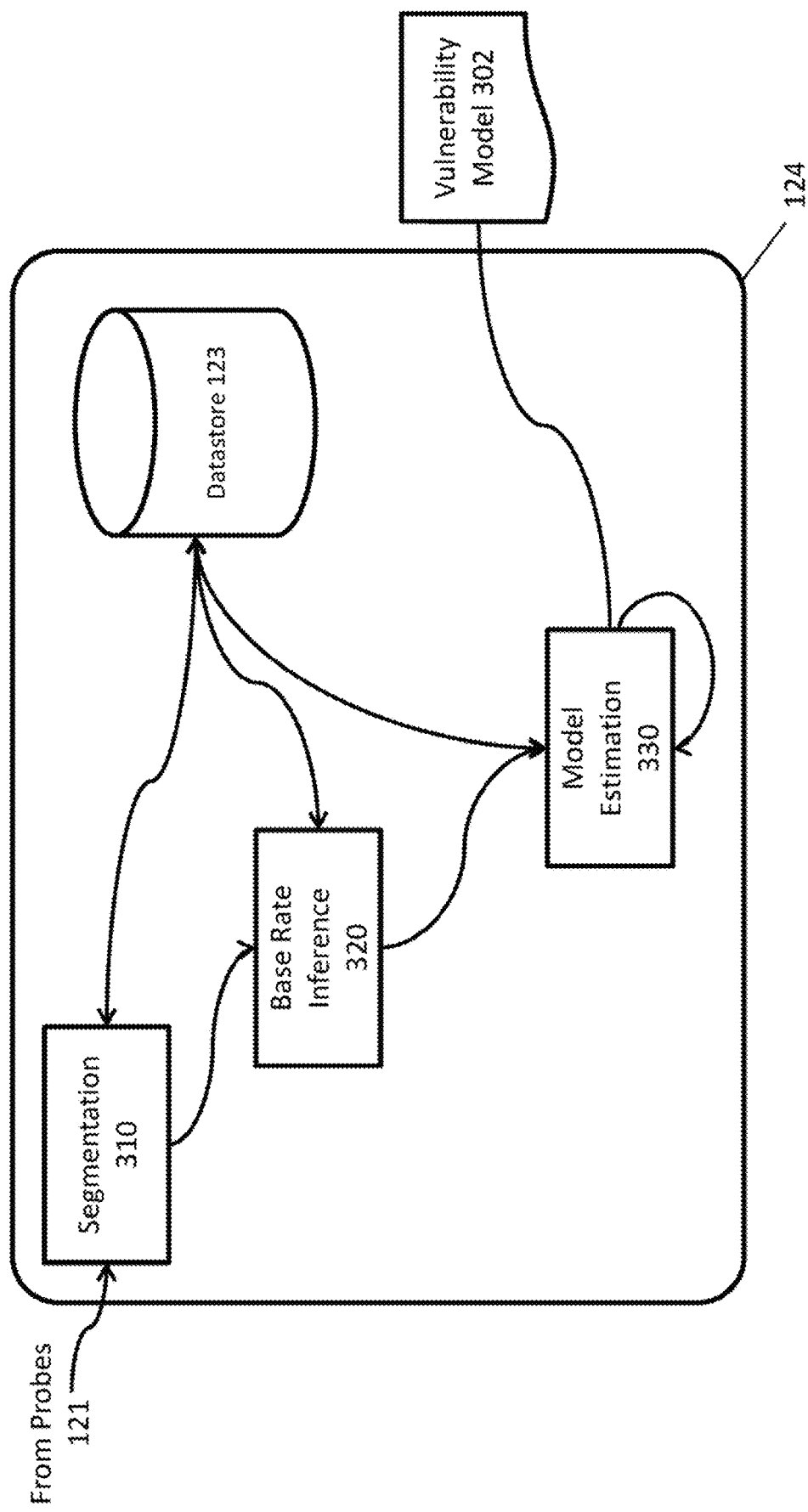
FIG. 3 is a schematic view illustrating a risk evaluation module according to various embodiments.

FIG. 3 shows a component view of the evaluator 124. Evaluator 124 includes segmentation component 310, base rate inference component 320, and model estimation component 330. The output of model estimation component is the vulnerability risk score identified above.

The segmentation component 310 identifies populations with various similarities and groups them into populations and sub-populations. Both instant values (from probes 121) as well as stored values (from datastore 123) are provided to the segmentation component. In some embodiments the populations and sub-populations can be predefined. In other embodiments they may be discovered. Various embodiments of the segmentation component are contemplated.

In one embodiment, especially helpful for bootstrapping, the segmentation component uses a) organization size, b) type of business or mission, c) technology choice, and d) a bucketized "update speed" as a first grouping mechanism. The rationale for organization size is that similar-sized organizations will or should have roughly similar budgets, head counts, and capabilities. The model does not assume that larger is always better; at a certain level of organization, there are organizational control and management issues that can hamper the effectiveness of many organizations. But it is not reasonable to have a large organization such as a multinational bank in the same risk group as a local savings and loan, even if the organizational purposes are similar. The rationale for organization type, or mission, is that certain types of businesses have a higher risk of attracting unwanted attention. These can include businesses that handle confidential or classified information (such as defense contractors); businesses that handle money (such as banks or payment processors); businesses that have prominent intellectual property (such as movie or game producers); or companies that have a higher public profile (such as consumer electronics companies). The rationale for technology choices is that different types of technologies are both representative of a technical culture within an organization, and that there are different inherent risks associated with certain types of delivery mechanisms. For example, an organization that uses Java will have a different attack profile than one that uses Lisp, if for no other reason than Lisp is far less common and it has fewer prepackaged attack vectors. Finally, the rationale for "update speed" is that it is representative of the internal processes related to the maintenance and care of the organization's technological capabilities.

In a second embodiment, especially useful for online learning, a set of existing organizations are identified and their inferred base rate is identified using both actual disclosures sourced from public documents as well as correlations between types of technologies used and the vulnerability rates and types from the national CVE database (both as discussed above relative to non-domain-specific feeds). The national vulnerability database categories, available from https://nvd.nist.gov/vuln/categories, as well as the information from the database itself, is used as the seed information. Regression analysis, using Equation 1, is then used to identify the most significant factors associated with vulnerabilities:

$$Y = a + bX \quad \text{(Eq. 1)}$$

$$b = \frac{N\sum XY - (\sum X)(\sum Y)}{N\sum X^2 - (\sum X)^2}$$

$$a = \frac{\sum Y - b\sum X}{N}$$

Where N=the number of observations associated with a particular category, X is a time index, (here months), and Y is the total number of organizations evaluated for the associated time index. The most significant factors in the regression analysis are used to segment the population into equivalent-risk pools.

In a further embodiment, an initial segmentation algorithm is gradually shifted over time to use an online-learned segmentation structure. In one embodiment, this is implemented using a neural classification network 400 as depicted in FIG. 4a. According to this embodiment, the neural classification network is implemented with input nodes 402, recurrent nodes 404, and output nodes 406. The number of input nodes is regularized to the dimensionality of the number of factual model implied by the number of instant and time series inputs either gathered from probes 121 or sourced from datastore 123. The recurrent nodes 404 are implemented using one of LSTMs, deep learning networks, or GRUs with a tan h activation function. Recurrent network cells are chosen to maximize the breadth of inference across the factual model providing input. In one embodiment, the recurrent nodes are organized in five hidden layers with sizes approximately equal to:

$$H_{1,2} = 2/3(N_i)$$

$$H_3 = 1/3(N_o)$$

$$H_{4,5} = 2/3(N_i) \quad \text{(Eq. 2)}$$

Where $H_x$ is the layer in question and $N_i$ is equal to the number of nodes in the input layer and $N_o$ is equal to the number of nodes in the output layer. This architecture is designed to allow a multifactor representation of the input in the first two hidden layers, force compression of representation (and thus information loss) in the third layer, and provide an expanded representation from the compressed value to the parameters of interest in the fourth and fifth layers. In a second embodiment, there are three hidden layers with approximate sizes:

$$H_1 = 2/3(N_i)$$

$$H_2 = 1/2(N_i)$$

$$H_3 = 4/3(N_o) \quad \text{(Eq. 3)}$$

This embodiment proceeds from the perception that this is a multi-factor mapping problem from a higher to a lower dimensional space, so a straightforward compressive architecture should be sufficient. The number of output nodes 406 is sized to a the number of binary classifications associated with each group. The association of a particular organization with a particular group is encoded a vector of the various binary classifiers, shown as vector 408.

Figure 4B:
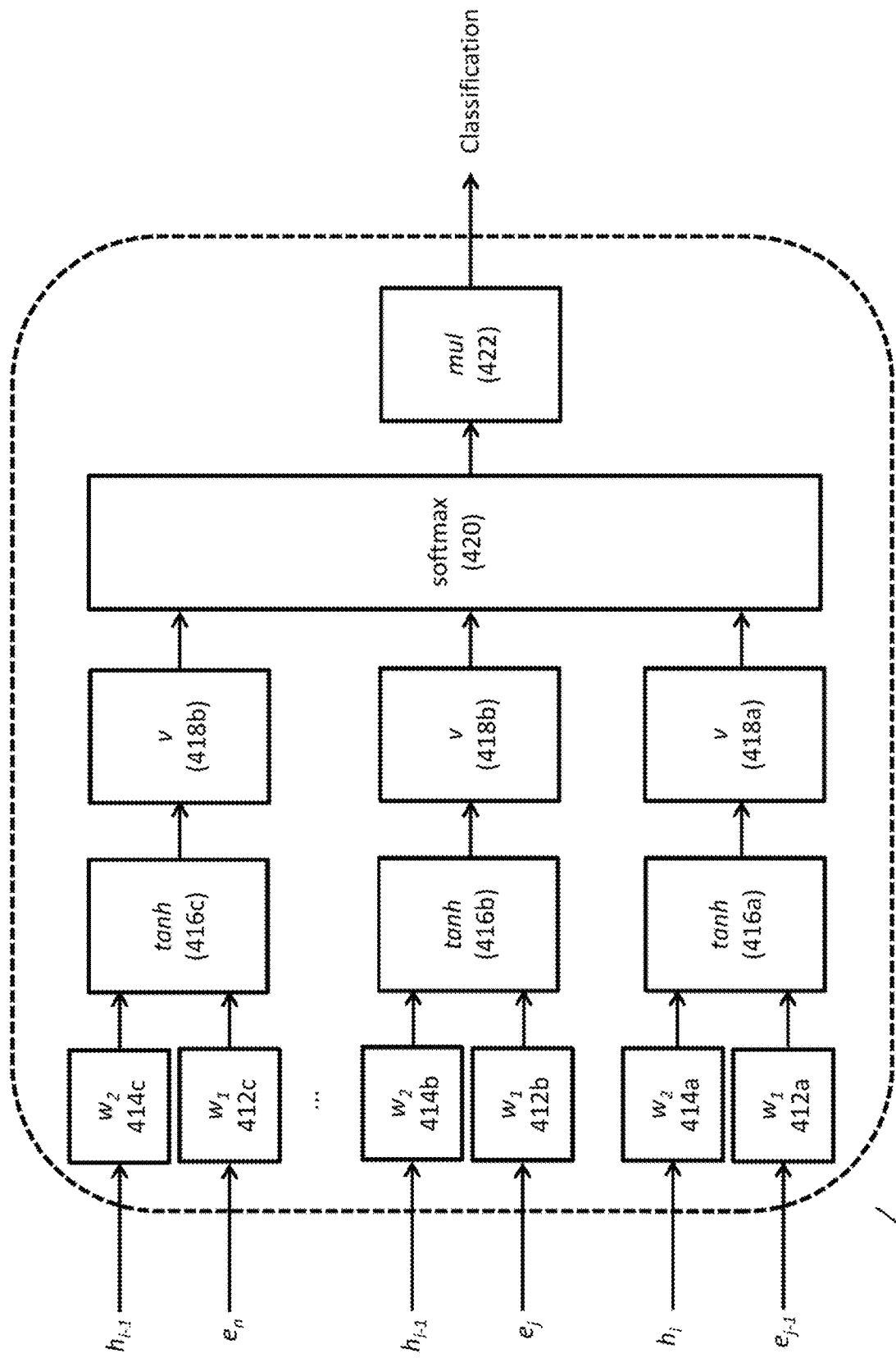
FIG. 4b is an attention mechanism as used in various embodiments.

In another embodiment, an attention mechanism is also used to improve the correlation of different inputs to outputs. One embodiment of an attention mechanism is shown in FIG. 4b. For each encoded input e from the RNN discussed relative to FIG. 4a, the attention network calculates:

$$\text{attention}_{ij} = v \cdot \tan h(e_i \cdot w_1 + h_j \cdot w_2) \quad \text{(Eq. 4)}$$

A particular encoded vector $e_i$ at decoding step $h_j$ is multiplied by parameters w1 (at 412a-c), $w_2$ (at 414a-c), with the outputs combined via tan h activation function (at 416a-c) and weighted by v (at 418a-c), with $w_1$, w2, and v as learned parameters. The attention score for each encoded vector is calculated by normalizing the vectors via softmax function 420 and then multiplying the output by its weight, (at 420) which is fed to each layer of the classification RNN 400.

Returning to FIG. 3, base rate inference component 330 performs Bayesian inference using the marginal likelihood of two different models correctly predicting the associated data:

$$P(D \mid M) = \prod_{i=1}^{n} \prod_{j=1}^{q_i} \frac{\Gamma(N'_{ij})}{\Gamma(N'_{ij} + N_{ij})} \prod_{k=1}^{r_i} \frac{\Gamma(N'_{ijk} + N_{ijk})}{\Gamma(N'_{ijk})} \quad \text{(Eq. 2)}$$

Figure 7:
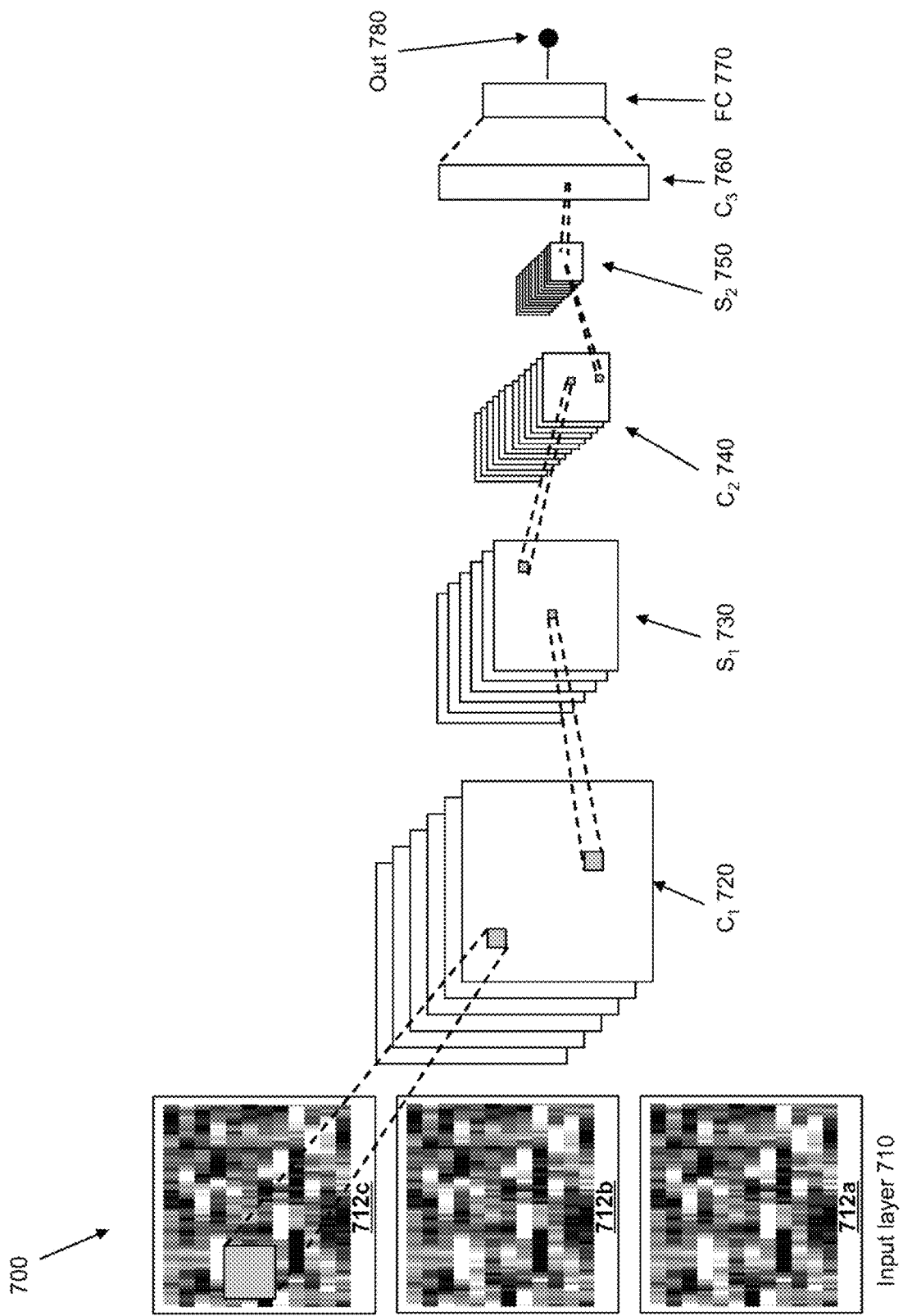
FIG. 7 shows a convolutional neural network used in various embodiments.

The input to model estimation component 330 is a set of initial observations. For each initial observation, it is given a set of candidate outcomes. Then, the features are used to train the classifier, which learns to identify the prior probability of a particular item leading to a vulnerability. In one embodiment, this is done as a form of supervised learning, where known information (or information that has a high-enough likelihood of being correct) is used to inform the probabilities of an organization being susceptible to a particular vulnerability given one or more classification criteria. The sum of the posterior probabilities accounting for each prior can then be calculated using equation 2. In an alternate embodiment where this is done via a classifying neural network, similar to the classification networks herein relative to FIGS. 4a, 4b, and. FIG. 7.

Figure 5C:
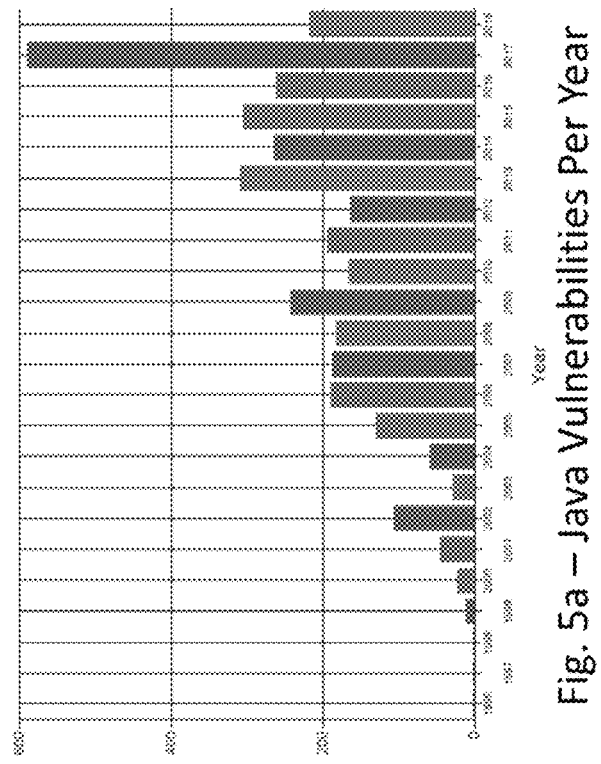
FIG. 5c is a graph showing the comparative popularity of Python vs. Java.

Turning briefly to FIGS. 5a, 5b, and 5c, one implementation using information from the national vulnerability database to identify a inferred base rate of vulnerability is shown. FIG. 5a shows the rate of vulnerability disclosures associated with the technology "Java" over the past 20 years. FIG. 5b shows the rate of vulnerability disclosures associated with the technology "Python" over the same time period. FIG. 5c shows the relative prevalence of Java vs. Python deployments over the 2004-2018 period. As applied in the example embodiments described herein, an organization using Java would have an average rate of approximately 350 vulnerabilities per year, whereas an organization using Python would have a base rate of approximately 35 vulnerabilities per year. After scaling the number of vulnerabilities to account for the differences in deployments, Python-using organizations during the 2004-2018 time period had an estimated vulnerability rate per deployment that varied from 0.3 vulnerabilities per week deployed to 0.07 per week deployed in 2018. During the same time period, a Java using organization would have an estimated vulnerability rate moving from 3 vulnerabilities per week to about 5 vulnerabilities per week deployed in 2018. In various embodiments, these raw numbers would also be subdivided by type of deployment, including higher-level application packages, as well as by severity of the vulnerability. Custom code created by the organization would have the implied base rate associated with the technology as a whole, whereas use of various packages would imply different base rates based upon the rate associated with that third party code.

Turning back to FIG. 3, the inferred base rate for each segment is provided to the model estimation component 330. The model estimation component is used to tune both the base rate estimate as well as to identify and model outliers. The base rate is directed to vulnerabilities not specific to any particular organization, but still relevant as possible attack vectors on organizations that use the underlying technologies. In one embodiment, the model estimation component 330 uses a neural network to model the correlation between a particular segment and its risk profile. One embodiment uses a recurrent neural network of the type previously discussed, but a convolutional neural network (CNN) is also contemplated. The following figures will describe an implementation where a set of recurring changes are converted into a form suitable for processing by a CNN and the associated CNN structure. In the context of the above description, this will be taught as an example using information from the backup/monitoring system 125 (described in further detail in incorporated application Ser. No. 15/885,777), although the same principles apply regardless of the periodic input used. It is contemplated to use a CNN to measure any multivariate or periodic input received via probes 121 or stored in datastore 123.

Figure 5C:
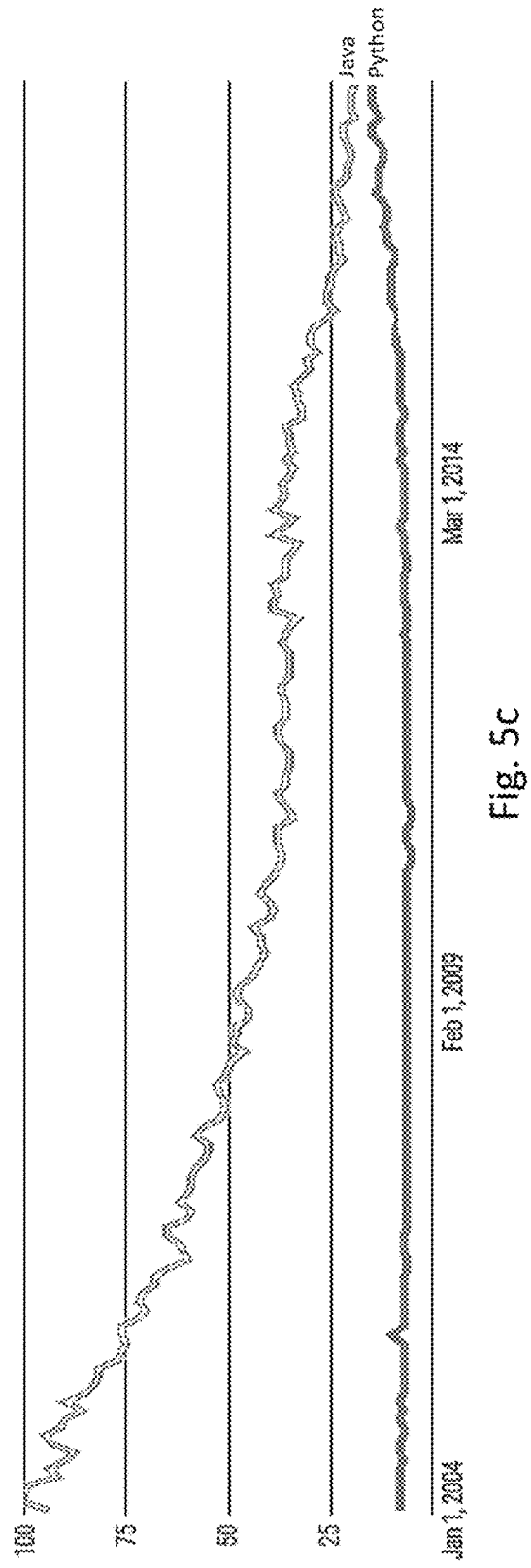

Another input to the vulnerability measurement system is the change in an organization over time. Certain types of changes can be recorded as a set of "change observations" over a particular unit of time. FIG. 6a shows a method of grouping data 600 according to one embodiment. At step 602, the events are collected and interpreted as a signal. In this case, the raw signal is the change events over time as shown relative to FIG. 5, either for an individual protected node or summed across the monitored system. At step 604, the events are converted to a frequency domain representation. In order to convert an event into a frequency, the time between the last two matching events (in this example, the last two accesses) is considered to be the relevant time frame for the grouping.

At step 606, the frequency domain representation is collapsed into a frequency spectrum. Turning briefly to FIG. 6b, the line graph shows the frequency of change associated with a measured quantity. This is graphed as a number of changes over a period of time. Graph 630 in FIG. 6c shows the result of applying a Fourier transform to the frequency data. Various recurring patterns in the in changes will be shown as frequency subcomponents with amplitudes scaled to the number of events giving rise to particular event-frequency relationships. This allows the model to interpret widely-spaced events in the context of their importance to various periodic processes, and not just as noise. It is expected that some types of events will be essentially "noise," however, so in one embodiment an amplitude filter is applied to frequency representation, dropping all events below a certain amplitude. This allows for spurious events that do not happen harmonically to be dropped.

At step 608, the events are grouped into classes, based upon their closeness to each other. In one embodiment, this is accomplished by grouping the event frequencies into a series of Gaussian functions, interpreted as fuzzy sets. Individual events can either be proportionately assigned to overlapping groups, or fully assigned to the predominant group for a particular frequency. In one embodiment, the grouping of frequencies is completely automated to avoid the introduction of human values as a filter. In another embodiment, various human-interpretable time periods are used as the basis for groupings. Exemplary time periods include one hour, one day, two days, three and one half days (i.e., half a week), a week, two weeks, a month, and a quarter. The intuition associated with automatic grouping is that natural rhythms in business processes are observable by seeing changes in user data over time, and that identifying those rhythms provides value. Alternatively, bucketing events into human-identified timeframes has the advantage of forced alignment with business decision timelines.

Figure 6D:
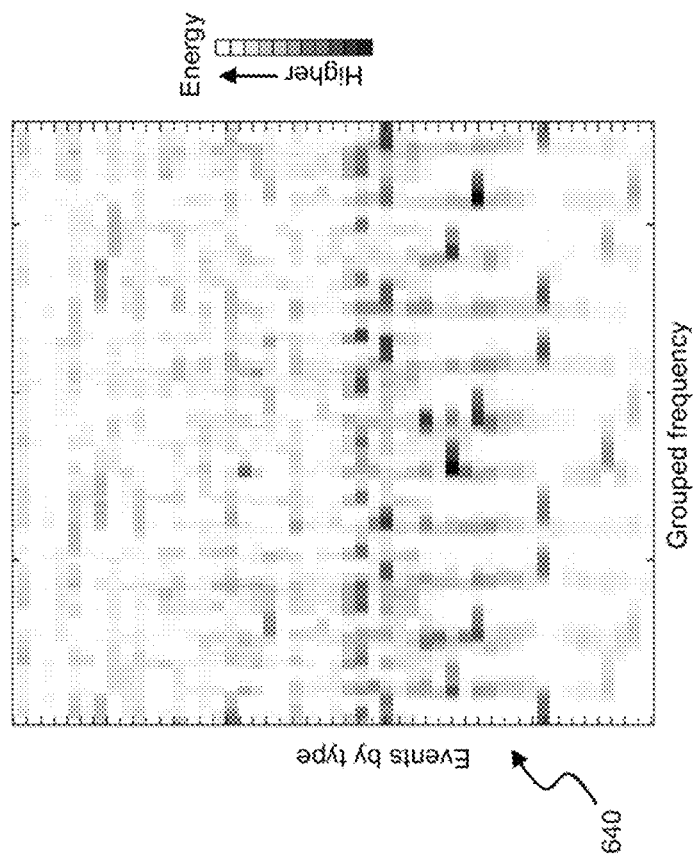
FIG. 6d shows a set of periodic measurements grouped by frequency and intensity.
Figure 6C:
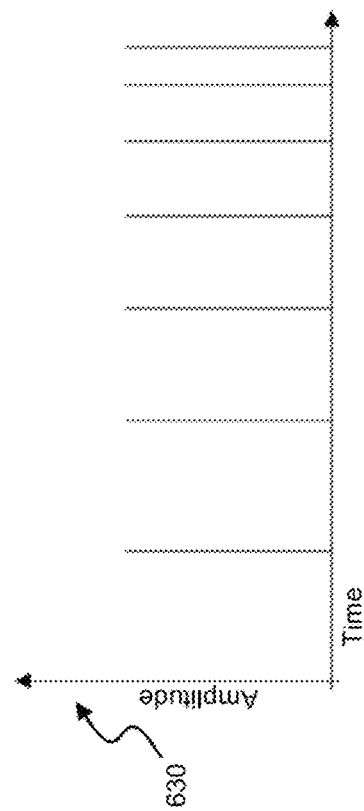
FIG. 6c is a graph showing a Fourier transform of a periodic trace.

Turning briefly to FIG. 6d, a graphical representation of the mapping of events to frequency classes is shown at reference 640. Each increment along they axis is an event, separated by type. Each grouping along the x axis is a range in the frequency domain. The value of the sum total of the events in a particular event×frequency domain is shown by the color of the square, with higher energy (equaling more events) occurring in that space. This visual representation of the grouping makes clear the varying periodicity in the pattern of accesses.

Turning back to process 600, at step 610 the values within a certain group are normalized. In one embodiment, the groups are characterized by the most frequent value. In another embodiment, the groups are characterized by a start or termination value (e.g. days, weeks, months, etc.). This can be interpreted as a type of quantization of the events.

Figure 6E:
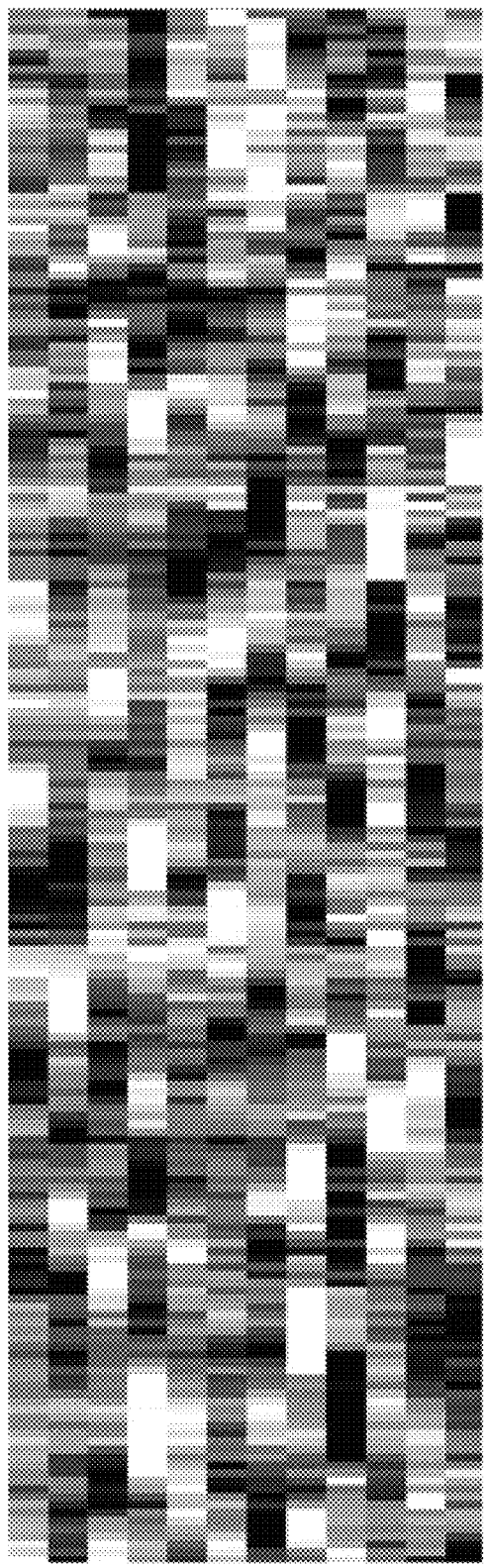
FIG. 6e shows a chromagram.
Figure 6F:
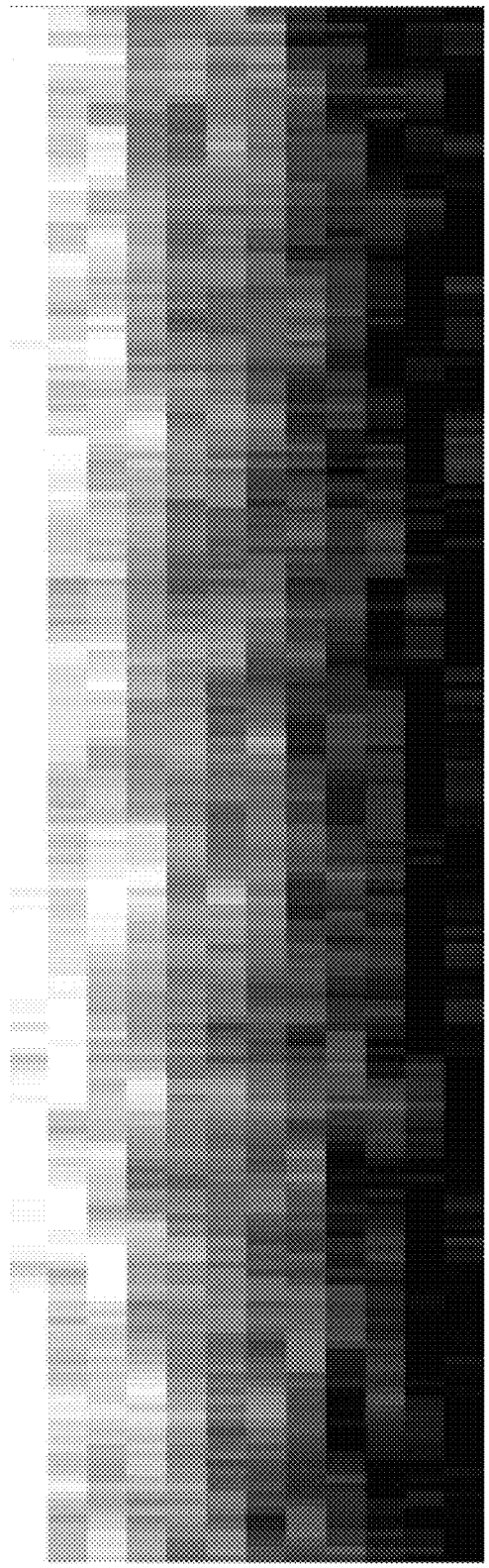
FIG. 6f shows a sorted chromagram.

At step 612, the quantized events are turned into a chromagram. FIG. 6e shows a chromagram with the events in the original order, whereas FIG. 6f shows the same data with the events organized by total energy top to bottom. Clear classes of events can be discerned by looking at the various energy (frequency) levels associated with different types of events.

At step 614 the values from the chromagram are used as the input to the model as discussed below. While the information has been shown in graphical form in FIGS.

6b-6e, the underlying representation is a matrix of values corresponding to individual file events (or classes of file events) and their frequency representation, including a value for the energy associated with each aspect of the frequency as measured according to an input value scaled between 0.0 and 1.0. (The graphical representation shown maps these energy levels to grayscale values.)

In various embodiments, other types of data are also subjected to frequency analysis and represented as a matrix of data. The first is information associated with policies for backup or data retention, as managed by the policy manager 140. The policy manager has human-directed policies that indicate how frequently certain systems should be backed up and how long data should be retained. While the analysis associated with various embodiments is distinct from a pure policy-oriented "what should be" protected, the intuition remains that there has been human selection of "important" systems and data, and that there has also been a judgment of how long data remains "relevant"—i.e., valuable. A representation of what "should be" backed up is therefore coded as a frequency-file-matrix and used for evaluation by the system.

In other embodiments, a representation of the inferred internal processes associated with the organization is also represented as a feature matrix. The value of certain visible changes in the nodes or application stacks is represented, with the type of change being identified via a category. In various embodiments, this allows the periodic upgrading of a component to be represented as a vector, with the time delay as another vector, and changes to configuration as a third. This allows the actions on organization data or organization nodes to be correlated to outside changes in the vulnerability status of one or more components. As this is a cross-correlation between two matrices with a similar time dimension, a restricted Boltzmann machine (RBM) is used to form the mapping between the input values and the output values as a non-linear correlation. Because the time dimension is explicitly captured by running the events through a Fourier transform, the use of a recurrent neural network (RNN) or something with a memory is not needed, but an alternative implementation could also use a Long Short-Term Memory (LSTM)-based RNN and view the information as a time series with online learning.

FIG. 7 shows a system for correlating observed system information to evaluate risk according to one embodiment. The system 700 is a multilayer convolutional neural network (CNN) consisting of seven layers. In one embodiment, input layer 710 takes a set of input matrices that are concatenated together. If necessary, the matrices are grouped or "stretched" to make sure that they have a consistent dimension so that the input dimensions are consistent. In a separate embodiment, some aspects of the various matrices can be encoded into separate channels. For example, various matrices can be encoded into the "R," "G," and "B" elements of an RGB pixel. The time dimension is identical for all three matrices so that they stay aligned.

Turning to layers $C_1$ 720, $S_1$ 730, $C_2$ 740 $S_2$ 750, and $C_3$ 760, each C layer is a fully convolutional layer and each S layer is a subsampling layer. In one embodiment, each of the convolutional layers 720, 740, and 760 have six hidden layers with a 5×5 convolution, and each of the subsampling layers 730 and 750 divide the input size by one half, with activation function:

$$y_j = \varphi(v_j) = A \tan h(Sv_j) \quad \text{(Eq. 1)}$$

The FC layer 770 is a fully-connected RBM with one input unit used for each input pixel after layer 760, and 2n hidden layers. The output 780 corresponds to an estimated value of the risk versus the baseline given the observed data.

Those of skill in the art will note that CNN 700 is a variation the LeNet CNN architecture, but the observed function is a mapping of matrix data to a scalar value. Other CNN architectures can also be substituted. This allows a number of different evolving neural network architectures to be used. The method of training these CNN architectures, including learning rate, dropout, and number of epochs varies according to the architecture used. In one implementation, a backpropagation method is used to train the CNN to have the proper weights when presented with a ground truth output from a set of inputs. In this implementation, the output value is the change in value associated with a particular monetary flow, such as revenue, cost, liabilities, or total book value over the same time period (and usually some associated period after) the period where observational data is used to train the CNN. Each successive observation of the change in value is used as a separate training opportunity, and by minimizing the error over time the entire network can be simultaneously trained and used.

In various embodiments one or more estimators using different methodologies or different training data can be used together as a random forest. It is anticipated that initial values based upon statistical measurements and observed correlations can be used to initialize the weights in the estimation model and that online training will be used to modify and update the various estimators, segmenting functions, internal weights, and final risk scores based upon experience. It is important to note that the output risk score is unitless; it is a pure comparative score based upon both average risk values and offsets from those average risk values based upon observed choices over time and the associated inferences as to internal maintenance processes. Logically, risk has both an ambient element (all organizations have a set amount of risk for being involved with the public) as well as a private element (how each organization mitigates or exacerbates risk based upon actions). It is contemplated that there will be two feedback mechanisms available for ongoing reevaluation of risk. In a marketplace where cyber insurance is offered for organizations, it is anticipated that any business disruptions will be reported to the insurer for recompense. This allows the reevaluation of the traits associated with that cyber insurance subscriber to be retroactively reevaluated as having higher risk. For non-subscribers, public information associated with loss of data (exploits, user information loss, etc.) can be used for the same purpose. It is expected that the various correlates that go into risk evaluation will be scaled so that they all converge to approximately equal values. In this fashion, estimates of loss, either reported directly to the insurer or available publicly, can be used to estimate the value of a risk "point."

While it is anticipated that in some cases the types of losses will be able to be valued in dollar terms (particularly for subscribers), it is not necessary to correlate money flows with risk in all cases, It is enough to know that for a particular organization, representative of a particular segment based upon size, age, technology choice, updating frequency, and configuration, it was not enough and an adverse event occurred. This has the effect of both changing then risk profile associated with that segment (and any correlated segments) as well as changing the exact measurement of risk associated with that organization's choices. As an analogy, teen drivers have higher insurance rates because they are in a risky class; teenagers are in a risky class because they have proportionately more accidents.

Various unique advantages are evident to those of skill in the art based upon one or more embodiments. In one embodiment, the value of changes in policy or behavior is added to all non-policy based events and evaluated for the expected value of the underlying flows. A policy that tends to reduce risk will have a higher expected value, thus providing a feedback target for evaluating different policies.

In one embodiment, the changing value of the expected value of the sum of all user data changes in an organization is usable as a real-time risk monitor. New changes that are not protective of key files and processes will have either a less-positive or negative value, even if they have not been seen before. Thus, changes in expected value (and associated business risk) will be immediately apparent, allowing the dynamic pricing of risk and real-time corrective measures.

In one embodiment, a public record of the underlying information leading to the risk score can be recorded, for example in a blockchain. In a first embodiment, the risk scores associated with one or more organizations are stored, possibly in encrypted or summary fashion on the blockchain. In a second embodiment, the multidimensional factors leading to a particular risk score can be stored as a matrix, together with a risk score at a certain point in time. This allows the public tracking and recording of risk scores over time, while still maintaining as a trade secret the corresponding interpretation of the factors that makes the risk score interpretable.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system for detecting and quantifying relative system vulnerabilities, the system comprising:
    a domain, the domain comprising a plurality of information processing systems under common business control, each information processing system including a processor and a memory, an operating system executing on the processor, wherein the information processing system is coupled to at least one storage, the at least one storage including a plurality of files, the plurality of files including at least one application, the application including a file comprising a set of processor-executable instructions, wherein the operating system causes the application file to be loaded and the processor-executable instructions executed by the processor, the application file providing at least one network-visible interface;
    a plurality of monitoring probes associated with the plurality of information processing systems, wherein each information processing system is associated with at least one monitoring probe; each monitoring probe interacting with one of the operating system and the application-provided network-visible interface, wherein each monitoring probe records an event observation and an associated timestamp;
    a first time series accumulator receiving the plurality of event observations and time stamps and correlating them according to their time of occurrence;
    an evaluator, the evaluator including:
        a frequency domain transformer operable to take set of time-correlated event observations and represent them as an event feature matrix, each correlated event type being represented by a first dimension in the matrix and the occurrence information being represented by a second dimension in the matrix;
        a matrix correlator operable to align a set of feature matrices according to one or more shared dimensions;
        a neural network trained with a multidimensional mapping function associating a first set of input feature matrices output from the matrix correlator with an output feature matrix;
    wherein the output feature matrix represents a relative probability of system disruption due to a vulnerability on one or more of the plurality of information processing systems.

2. The system of claim 1, wherein the time series accumulator stores information associated with a plurality of domains.

3. The system of claim 2, further comprising a vulnerability information input stream, the vulnerability information input stream including a vulnerable technology identifier corresponding to one of an operating system or an application and a time index.

4. The system of claim 3, wherein at least one event observation correlates the use of an operating system or an application used by at least one information processing system with a vulnerable technology identified in the vulnerability information input stream.

5. The system of claim 4, wherein the use of an identified vulnerable technology on at least one information processing system in a domain is correlated with a change in the relative probability of system disruption.

6. The system of claim 4, wherein the time between an event observation recording the use of a vulnerable technology and an event observation recording the vulnerable technology no longer being used is correlated with a change in the relative probability of system disruption.

7. The system of claim 3, wherein the relative probability of vulnerabilities for a particular technology as measured from the rate of technology-specific vulnerabilities listed in the vulnerability information input stream is correlated with changes in the relative probability of system disruption for a domain using the same particular technology.

8. The system of claim 3, further comprising a domain information stream identifying business characteristics of the domain, the business characteristics including one of a number of employees, a business type identifier, and a revenue measurement, and wherein the relative probability of system is correlated with at least one business characteristic.

9. The system of claim 8, wherein the plurality of domains are divided by at least one business characteristic, and wherein the average probability of system disruption is computed within each division, and wherein the probability of use of each operating system and application is computed within each division.

10. The system of claim 9, wherein differences in the observed use of operating systems and applications within a particular domain is compared with the probability of use of each operating system and applications across the division to which the domain pertains, and the difference in observed use of operating systems and applications versus the expected use of operating systems and applications is correlated with differences in the relative probability of system disruption for the particular domain.

11. The system of claim 1, wherein the evaluator includes a multi-level convolutional neural network.

* * * * *